United States Patent [19]
Otonomiya et al.

[11] Patent Number: 5,416,650
[45] Date of Patent: May 16, 1995

[54] AUTOMATIC CASSETTE CHANGER

[75] Inventors: Yoshitaka Otonomiya; Nobuo Uda; Motofumi Itawaki, all of Kanagawa, Japan

[73] Assignee: Sony Corporation, Tokyo, Japan

[21] Appl. No.: 44,068

[22] Filed: Apr. 8, 1993

[30] Foreign Application Priority Data

Apr. 13, 1992 [JP] Japan .................. 4-118545

[51] Int. Cl.$^6$ ............................. G11B 15/68
[52] U.S. Cl. ........................ 360/92; 360/94; 360/96.5
[58] Field of Search ............ 360/71, 92, 94, 96.5, 360/98.04, 98.05, 98.06

[56] References Cited

U.S. PATENT DOCUMENTS

| 4,527,262 | 7/1985 | Manto . | |
|---|---|---|---|
| 5,032,939 | 7/1991 | Mihara et al. | 360/94 |
| 5,264,974 | 11/1993 | Campbell et al. | 360/92 |
| 5,303,214 | 4/1994 | Kulakowski et al. | 360/98.04 X |

FOREIGN PATENT DOCUMENTS

| 0227446 | 7/1987 | European Pat. Off. . |
| 0288165 | 10/1988 | European Pat. Off. . |
| 0334257 | 9/1989 | European Pat. Off. . |
| WO90/05362 | 5/1990 | WIPO . |
| WO91/06100 | 5/1991 | WIPO . |
| WO91/07731 | 5/1991 | WIPO . |

Primary Examiner—Aristotelis Psitos
Assistant Examiner—James L. Habermehl
Attorney, Agent, or Firm—William S. Frommer; Alvin Sinderbrand

[57] ABSTRACT

An improved automatic cassette changer is disclosed, which comprises a recording and/or reproducing apparatus, an accommodating rack having a plurality of bins for individually accommodating therein a plurality of cassettes, and a transporting apparatus for selectively transporting one of the cassettes accommodated in the bins to the recording and/or reproducing apparatus or vice versa. The transporting apparatus includes holding means for holding a cassette thereon, and first feeding means for feeding the holding means in a first direction in which a cassette held by the holding means is inserted into or removed from any of the bins and the recording and/or reproducing apparatus. The first feeding means includes a first slider movable in the first direction with respect to the transporting apparatus, a second slider having the holding means mounted thereon and movable in the first direction with respect to the first slider, and first driving means for driving the first and second sliders to move in the first direction.

24 Claims, 21 Drawing Sheets

F I G. 20
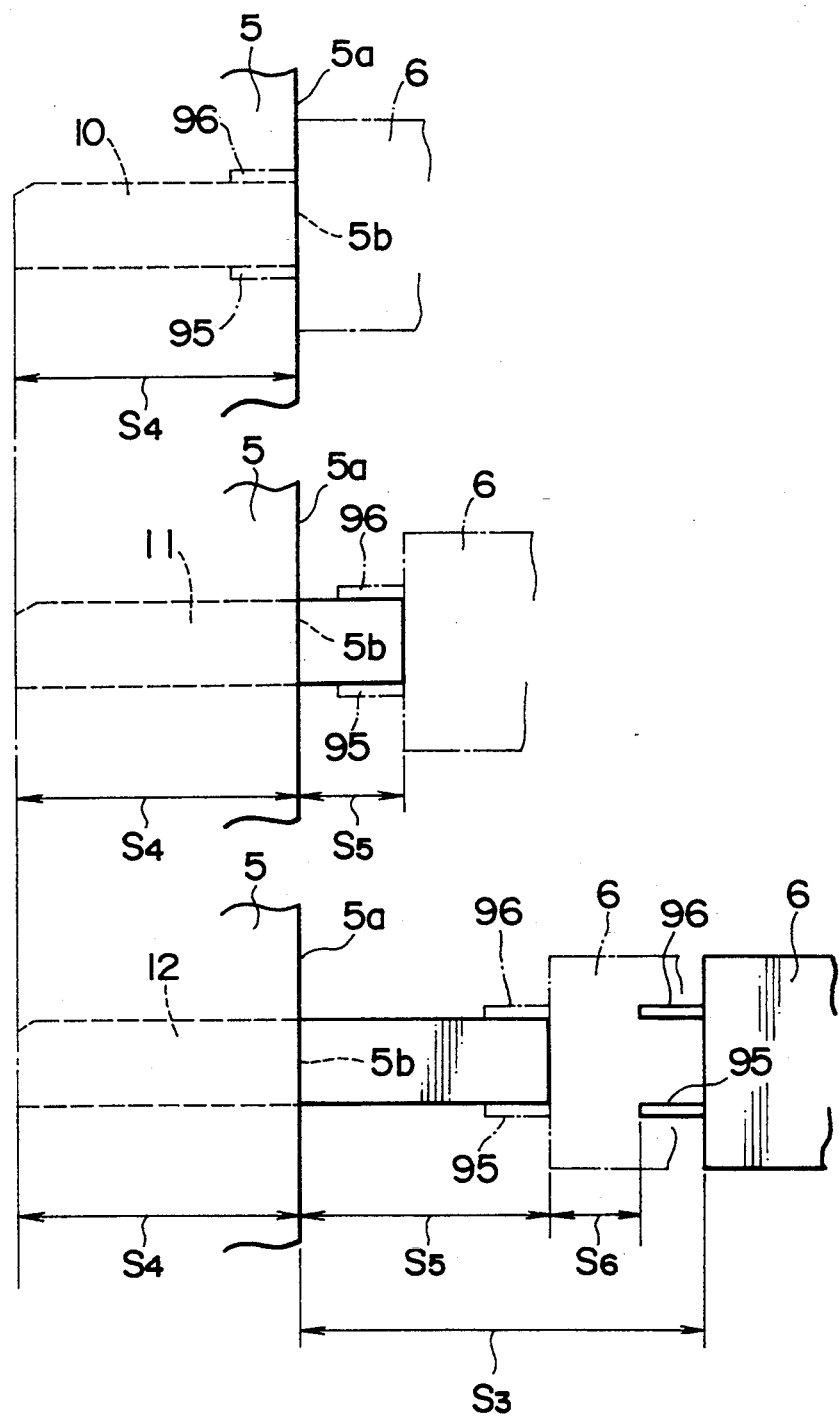

AUTOMATIC CASSETTE CHANGER

BACKGROUND OF THE INVENTION

1. Field of the Invention

This invention relates to an automatic cassette changer which automatically exchanges various types of cassettes in which recording media in the form of tapes or disks are accommodated to effect continuous recording and/or reproduction of the cassettes over a long period of time.

2. Description of the Related Art

An automatic cassette changer for a television broadcasting station wherein a plurality of types of cassettes having different sizes are automatically exchanged to effect continuous reproduction, recording or edition of video signals over a long period of time has been proposed by the assignee of the present patent application and is disclosed, for example, in Japanese Patent Application No. Heisei 3-315196.

The automatic cassette changer employs a shutter plate of the pivoting type and a photo-sensor as means for detecting the size and the accommodation position of any of a plurality of types of cassettes which are accommodated in a plurality accommodating racks and have different sizes. The shutter plates of the pivoting type and the photo-sensors are mounted independently of each other in conformity with the accommodation positions of the cassettes of the accommodating racks.

Accordingly, the automatic cassette changer must be provided with a large number of shutter plates of the pivoting type equal to the number of photo-sensors. Further, since a large number of photo-sensors are mounted independently of each other, a large number of sensor base plates equal to the number of the photo-sensors must be provided. Accordingly, the automatic cassette chamber is disadvantageous in that the number of parts and the number of assembling steps are very great and a very high cost is required, and besides that also wiring of wiring lines to the sensor base plates is complicated.

SUMMARY OF THE INVENTION

It is an object of the present invention to provide an automatic cassette changer wherein means for detecting the size and the accommodation position of any of a plurality of types of cassettes which are accommodated in a plurality of accommodating racks and have different sizes can be constituted from a reduced number of parts and assembled by a reduced number of assembling steps.

In order to attain the object described above, according to an aspect of the present invention, there is provided an automatic cassette changer, which comprises a recording and/or reproducing apparatus, an accommodating rack having a plurality of bins for individually accommodating therein a plurality of cassettes each having a recording medium accommodated therein, and a transporting apparatus for selectively transporting one of the cassettes accommodated in the bins to the recording and/or reproducing apparatus so as to be recorded and/or reproduced by the recording and/or reproducing apparatus or vice versa, the transporting apparatus including holding means for holding a cassette thereon, and first feeding means for feeding the holding means in a first direction in which a cassette held by the holding means is inserted into or removed from any of the bins and the recording and/or reproducing apparatus, the first feeding means including a first slider movable in the first direction with respect to the transporting apparatus, a second slider having the holding means mounted thereon and movable in the first direction with respect to the first slider, and first driving means for driving the first and second sliders to move in the first direction.

According to another aspect of the present invention, there is provided an automatic cassette changer, which comprises a recording and/or reproducing apparatus, an accommodating rack having a plurality of bins for individually accommodating therein a plurality of types of cassettes having different sizes, each of the cassettes having a recording medium accommodated therein, and a transporting apparatus for selectively transporting one of the cassettes accommodated in the bins to the recording and/or reproducing apparatus so as to be recorded and/or reproduced by the recording and/or reproducing apparatus or vice versa, the transporting apparatus including holding means for holding a cassette thereon, and first feeding means for feeding the holding means in a first horizontal direction perpendicular to a direction in which a cassette held by the holding means is inserted into or removed from any of the bins and the recording and/or reproducing apparatus, the first feeding means including a first slider movable in the first direction with respect to the transporting apparatus, a second slider having the holding means mounted thereon and movable in the first direction with respect to the first slider, and first driving means for driving the first and second sliders to move in the first direction.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 20 is a diagrammatic view illustrating delivery strokes of small, middle and large size cassettes from and to a video tape recorder.

DESCRIPTION OF THE PREFERRED EMBODIMENT

The present invention is described below in connection with a preferred embodiment wherein it is applied to an automatic cassette changer for video cassettes for a television broadcasting station.

Outline of Automatic Cassette Changer

Figure 1:
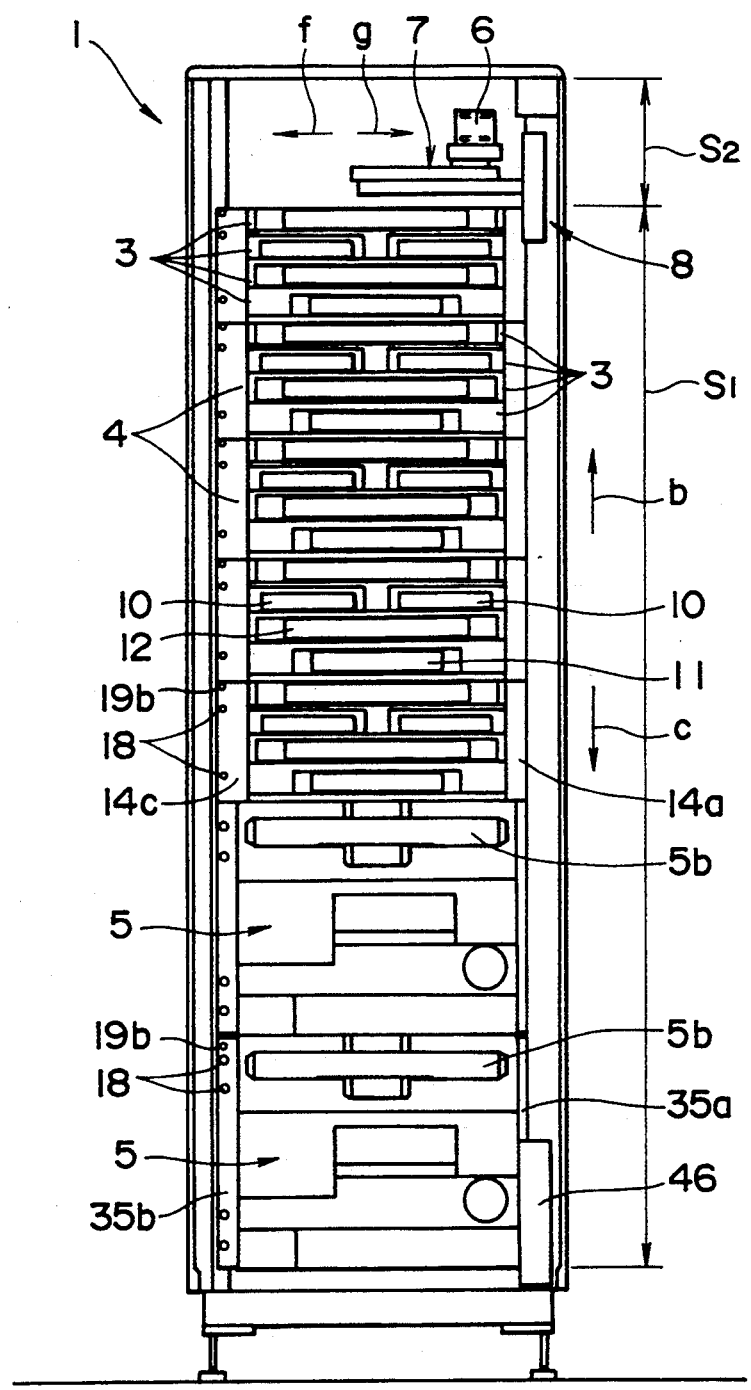
FIG. 1 is a front elevational view of an automatic cassette changer with a hinged door removed showing a preferred embodiment of the present invention.
Figure 2:
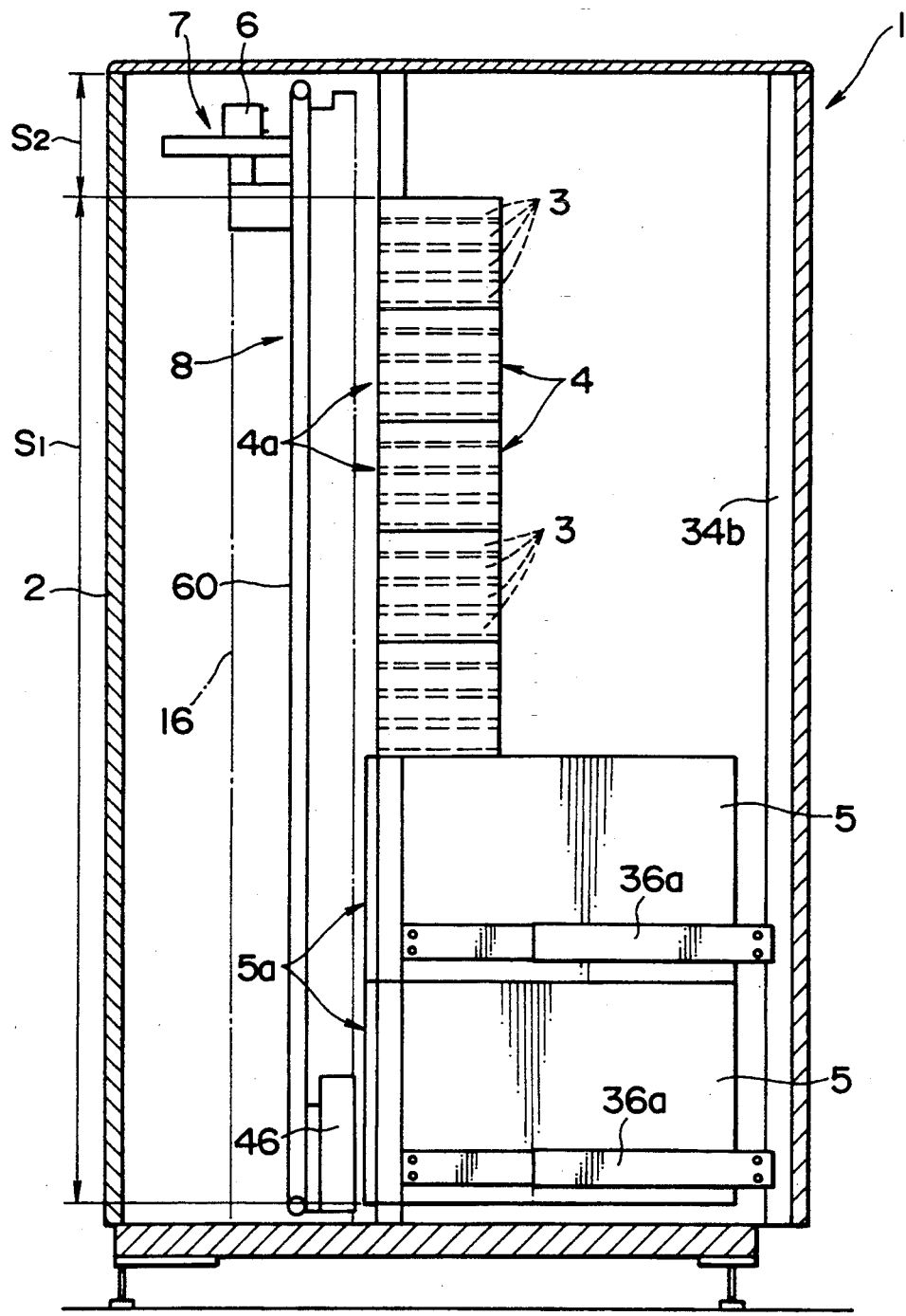
FIG. 2 is a side elevational sectional view of the automatic cassette changer of FIG. 1.
Figure 3:
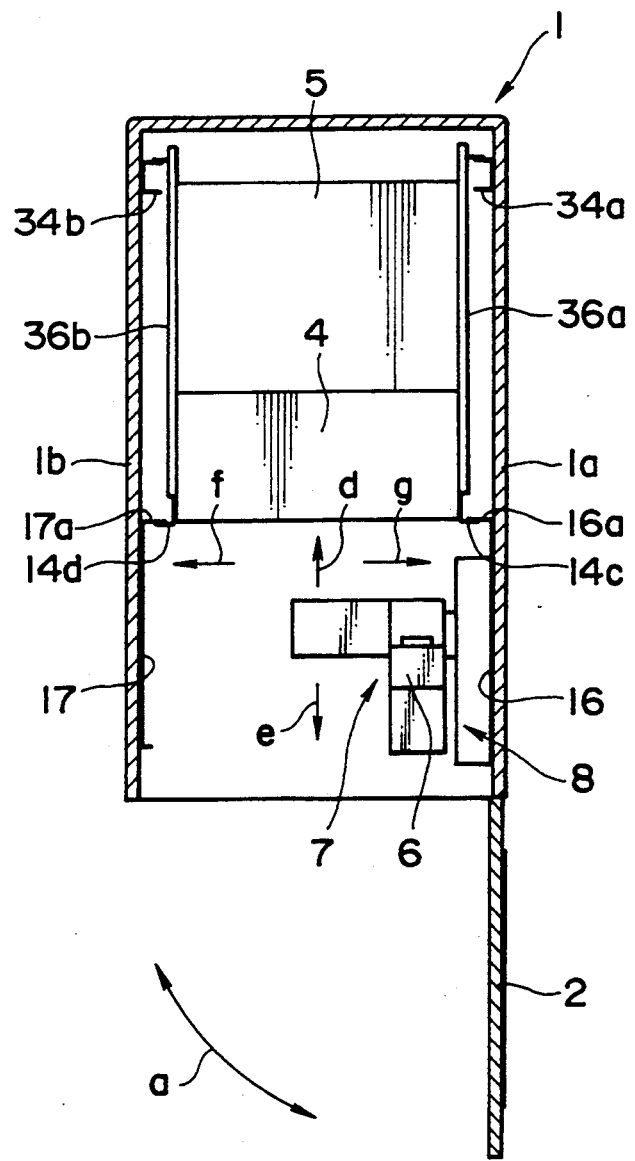
FIG. 3 is a horizontal sectional view of the automatic cassette changer of FIG. 1 with the hinged door opened.

Referring first to FIGS. 1 to 3, the automatic cassette changer shown includes a changer body 1 in the form of a housing of a rectangular parallelepiped shape elongated in a vertical direction. A hinged door 2 is mounted for pivotal opening and closing movement in the horizontal directions indicated by a double-sided arrow mark a. The changer body 1 includes a plurality of, five in the arrangement shown, rack units 4 arranged in a vertical column with one placed on another and each having a plurality of accommodation racks 3 arranged in a vertical column and formed as a unitary member. The rack units 4 are directed to the hinged door 2 side. A plurality of, two in the arrangement shown, video tape recorders 5 as recording and reproducing apparatus are disposed below the rack units 4 such that they are also directed to the hinged door 2 side. The rack units 4 and the video tape recorders 5 have front faces 4a and 5a arranged in a common plane.

A transporting machine 7 having a hand 6 for delivering a cassette and a transporting machine feeding apparatus 8 for transporting the transporting machine 7 in the upward and downward directions indicated by arrow marks b and c along the column of the accommodating racks 3 and video tape recorders 5 are disposed between the column of the accommodating racks 3 and video tape recorders 5 and the hinged door 2 in the changer body 1. A hand feeding mechanism, which will be hereinafter described in detail, is mounted on the transporting machine 7 and feeds the hand 6 in the horizontal directions indicated by arrow marks d and e in which a cassette is inserted into and removed from any of the accommodating racks 3 and video tape recorders 5 and also in the directions indicated by arrow marks f and g which are horizontal leftward and rightward directions perpendicular to the arrow marks d and e.

The changer body 1 has a transportation space S1 formed between the hinged door 2 and the accommodating racks 3 and video tape recorder 5. The transporting machine 7 is transported in the directions of the arrow marks b and c in the transportation space $S_1$. The changer body 1 further has a refuge space $S_2$ for the transporting machine 7 set above the transportation space S1 between the hinged door 2 and the column of accommodating racks 3 and video tape recorders 5.

Meanwhile, the present automatic cassette changer can accommodate three types of cassettes of different sizes including small size cassettes 10, medium size cassettes 11 and large size cassettes 12 at random in the accommodating racks 3 and selectively use them. Such small, medium and large size cassettes 10, 11 and 12 are accommodated into the accommodating racks 3 by manual operation of an operator opening the hinged door 2. In this instance, the small size cassettes 10 are accommodated to the left and right into the individual accommodating racks 3. The video tape recorders 5 are constructed as video tape recorders for common use with the small, medium and large size cassettes 10, 11 and 12 and each has a cassette insertion opening 5b commonly for use with the small, medium and large size cassettes 10, 11 and 12 formed in a front face 5a thereof.

In the present automatic cassette changer 1, the accommodation positions of the small, medium and large size cassettes 10, 11 and 12 accommodated at random in the accommodating racks 3 are retrieved and stored in memory in advance, and in response to a cassette exchange instruction signal, a designated one of the small, medium and large size cassettes 10, 11 and 12 is selectively held and automatically drawn out from a designated one of the accommodating racks 3 by the hand 6 and then transported to a designated one of the video tape recorders 5 and automatically inserted into the cassette insertion opening 5b of the video tape recorder 5, by a combination of a transporting operation of the transporting machine 7 in the direction of the arrow mark b or c by the transporting machine feeding apparatus 8 and a feeding operation of the hand 6 in the directions d or e and f or g, so that recording and/or reproduction of the selected cassette is performed on the designated video tape recorder 5. The cassette 10, 11 or 12 discharged to the outside of the cassette insertion opening 5b of the video tape recorder 5 after completion of such recording and/or reproduction is returned to its original accommodating rack 3 by operations reverse to those described above. Continuous reproduction of video signals or edition of recorded images is performed for a long period of time by repetition of such automatic cassette exchanging operation as described above.

Rack Units

Referring now to FIGS. 4 to 9, each of the rack units 4 is constructed such that, for example, four rack plates 15 are mounted in an equidistantly spaced relationship in a vertical column in a single unit frame 14 having a substantially channel shape in plan and each extends in a horizontal plane. An upper portion of each of the rack plates 15 is formed as an accommodating rack 3. In this instance, while the top of the rack unit 4 is open as seen in FIGS. 4 to 9, when the rack units 4 are placed one on another in a vertical column and mounted in the changer body 1, the top of each rack unit 4 except the top rack unit 4 is closed with a lowermost one of the rack plates 15 of another rack unit 4 positioned just above the rack unit 4.

Each of the rack units 4 is removably attached, at a pair of left and right mounting plates 14c and 14d formed integrally at a pair of left and right side plates 14a and 14b of the unit frame 14 thereof, to a mounting portion 16a of a mounting reference plate 16 and a mounting portion 17a of an auxiliary mounting plate 17, which are disposed on the opposite right and left sides in the changer body 1, respectively, and extend upwardly, each by means of a plurality of screws 18 such that the rack units 4 are placed one on another and attached at fixed distances in a column. In this instance, the distance between each adjacent rack units 14 is set accurately by means of pairs of right and left positioning pins 19a and 19b mounted horizontally at a fixed distance in the vertical direction on the pair of mounting portions 16a and 17a, respectively. It is to be noted that the video tape recorders 5 are removably mounted similarly at lower end portions of the mounting portions 16a and 17a of the mounting reference plate 16 and the auxiliary mounting plate 17.

A single center guide 21, a pair of stopper guides 22 and a pair of movable stoppers 23 are mounted on each of the accommodating racks 3 of each of the rack units 4 and serve as positioning means for selectively positioning small, medium and large size cassettes 10, 11 and 12, respectively. Thus, all of the accommodating racks 3 are constructed with a same structure.

The center guide 21 is a T-shaped plate formed from a center plate 21a and a pair of left and right wing plates 21b and is screwed horizontally to a rack plate 15 at the center P1 of the rack plate 3 in the leftward and rightward direction. A plurality of center guide pins 21 extend vertically upwardly from the center plate 21a along the rack center $P_1$.

The stopper guides 22 are screwed to the left and right side plates 14a and 14b of the unit frame 14. The stopper guides 22 are provided at positions higher than the center guide 21 and at the same phase positions as those of front faces (lower side in FIG. 6) of the left and right wing plates 21b of the center guide 21.

The movable stoppers 23 are mounted on a lower face of the rack plate 15 between the rack center P1 of the accommodating rack 3 and the left and right side plates 14a and 14b of the unit frame 14 and between a rear face plate 14e of the unit frame 14 and the center guide 21 and extend in parallel to the rack center $P_1$.

Figure 5:
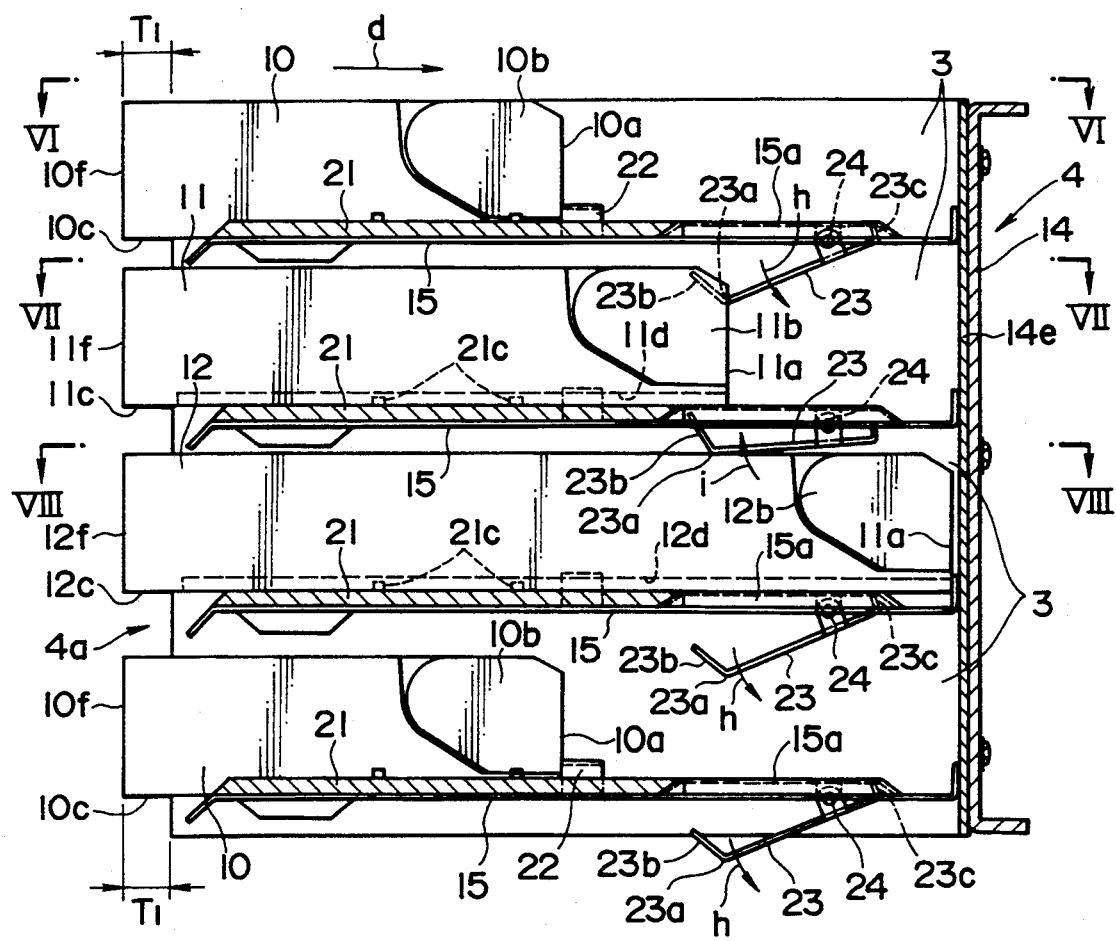
FIG. 5 is a sectional view taken along line A—A of FIG. 4 showing cassette positioning means.
Figure 9:
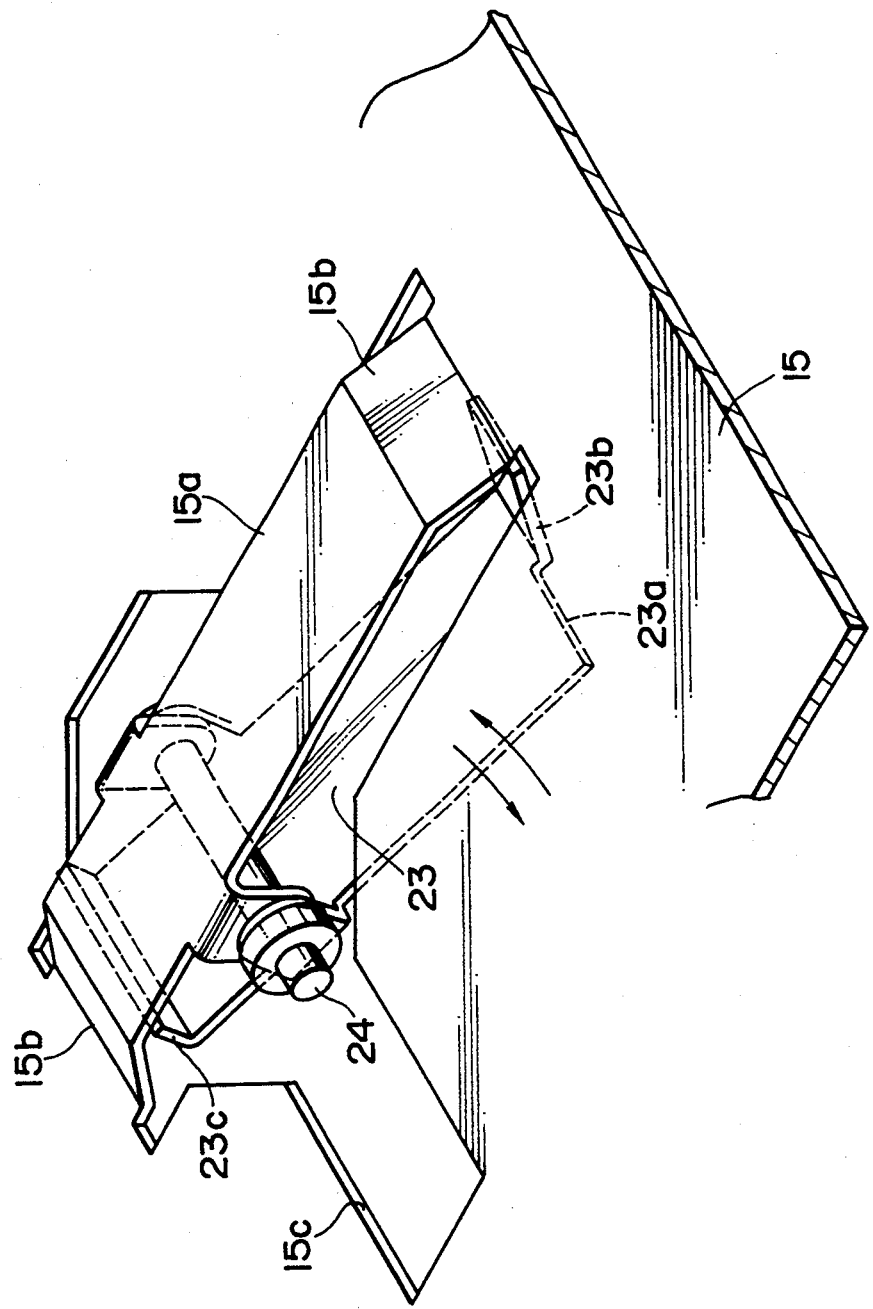
FIG. 9 is a perspective view showing a movable stopper of the cassette positioning means.
Figure 10:
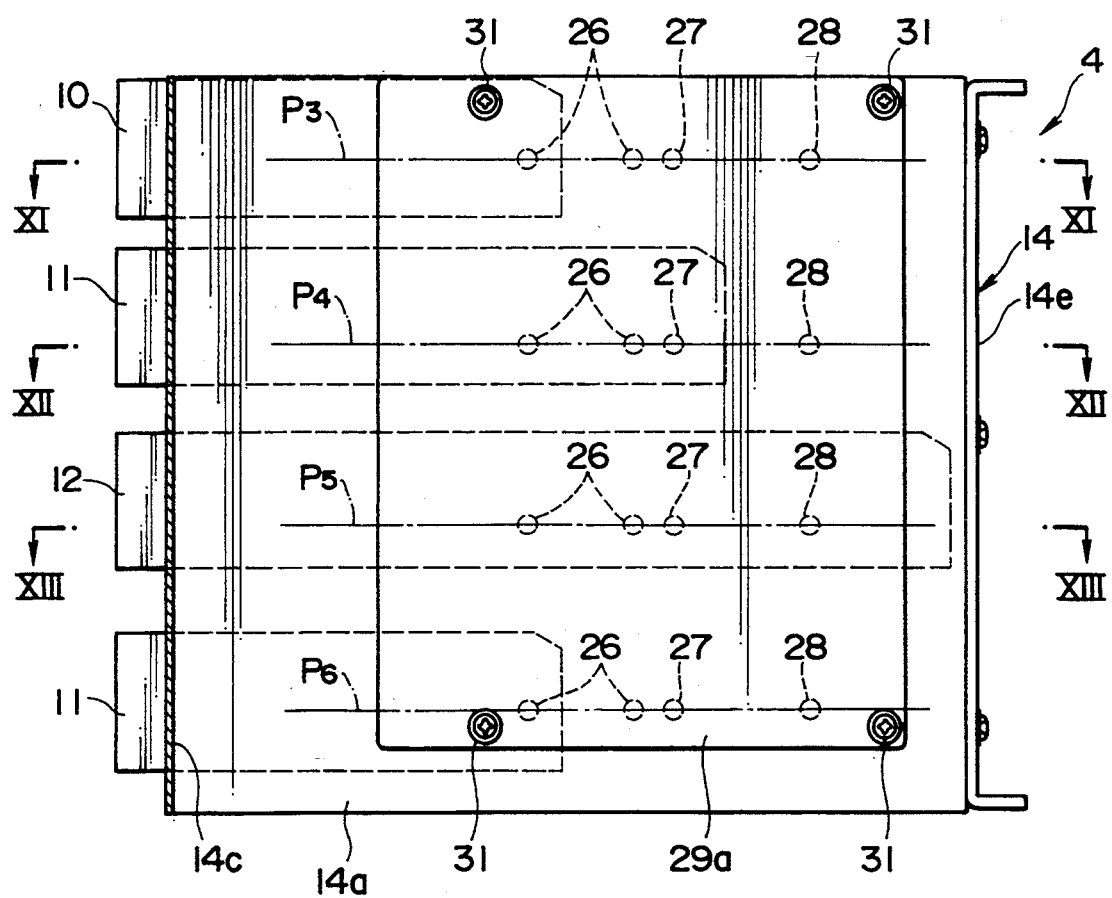
FIG. 10 is a sectional view taken along line E—E of FIG. 4 showing a cassette detecting photo-sensor.

Referring particularly to FIG. 9, the rack plate 15 has a pair of horizontal cassette tables 15a (only one is shown in FIG. 9) formed by cutting and raising the same. The horizontal cassette table 15a extends in parallel to the rack center P1 in a plane at a substantially same height as the plate thickness of the center guide 21 and connects to the rack plate 15 by way of a pair of front and rear inclined portions 15b. A movable stopper 23 is mounted for pivotal motion in the downward and upward directions indicated by arrow marks h and i, respectively, around a horizontal fulcrum pin 24 below the cassette table 15a. A stopper face 23a for a middle size cassette 11 is formed on the inner side of the front end (lower side in FIG. 7) of the movable stopper 23 and extents in parallel to the wing plates 21b of the center guide 21 while an inclined piece 23b for a large size cassette 12 is formed integrally on the outer side of the front end of the movable stopper 23. As shown in FIG. 5, the movable stopper 23 is biased to pivot in the direction indicated by an arrow mark i by its own weight and is stabilized in a specific inclined posture wherein a projecting piece 23c extending upwardly from the rear end of the movable stopper 23 abuts with the lower face of the cassette table 15a. In the inclined posture of the movable stopper 23, the inclined piece 23b is set to an angle inclined obliquely forwardly upwards. It is to be noted that, as shown in FIG. 9, a hole 15c is formed on the opposite sides of the cassette table 15a of the rack plate 15.

Front lids 10b, 11b and 12b are mounted for opening and closing movement on the front races 10a, 11a and 12a of the small, middle and large size cassettes 10, 11 and 12, respectively, and center grooves 10d, 11d and 12d are formed in the leftward and rightward directions at the centers of the bottom faces 10c, 11c and 12c of the small, middle and large size cassettes 10, 11 and 12, respectively.

Cassette Positioning Method in Accommodating Rack

Subsequently, positioning the small, middle and large size cassettes 10, 11 and 12 in the accommodating racks 3 will be described.

Figure 4:
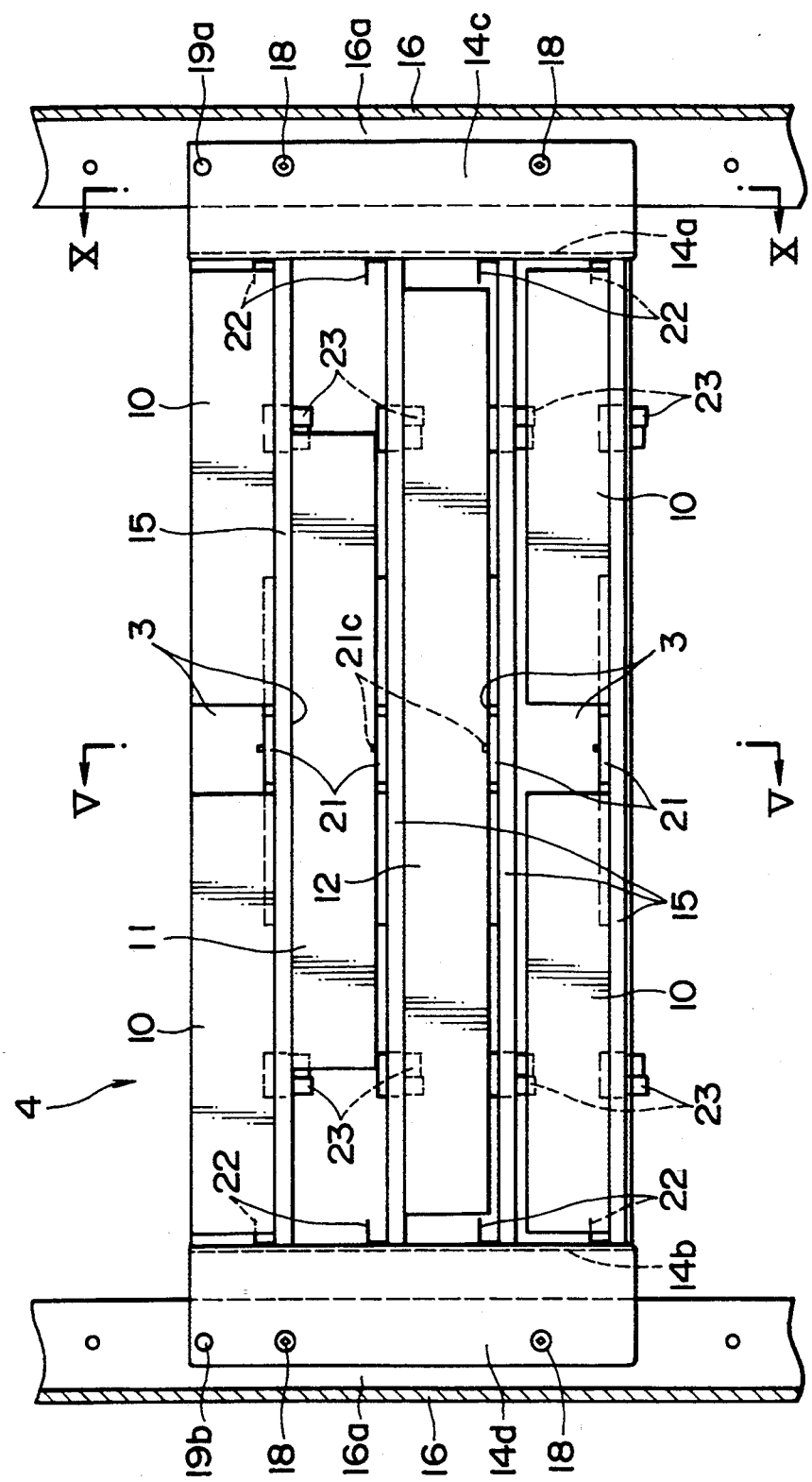
FIG. 4 is an enlarged partial front elevational view showing a rack unit of the automatic cassette changer of FIG. 1.
Figure 6:
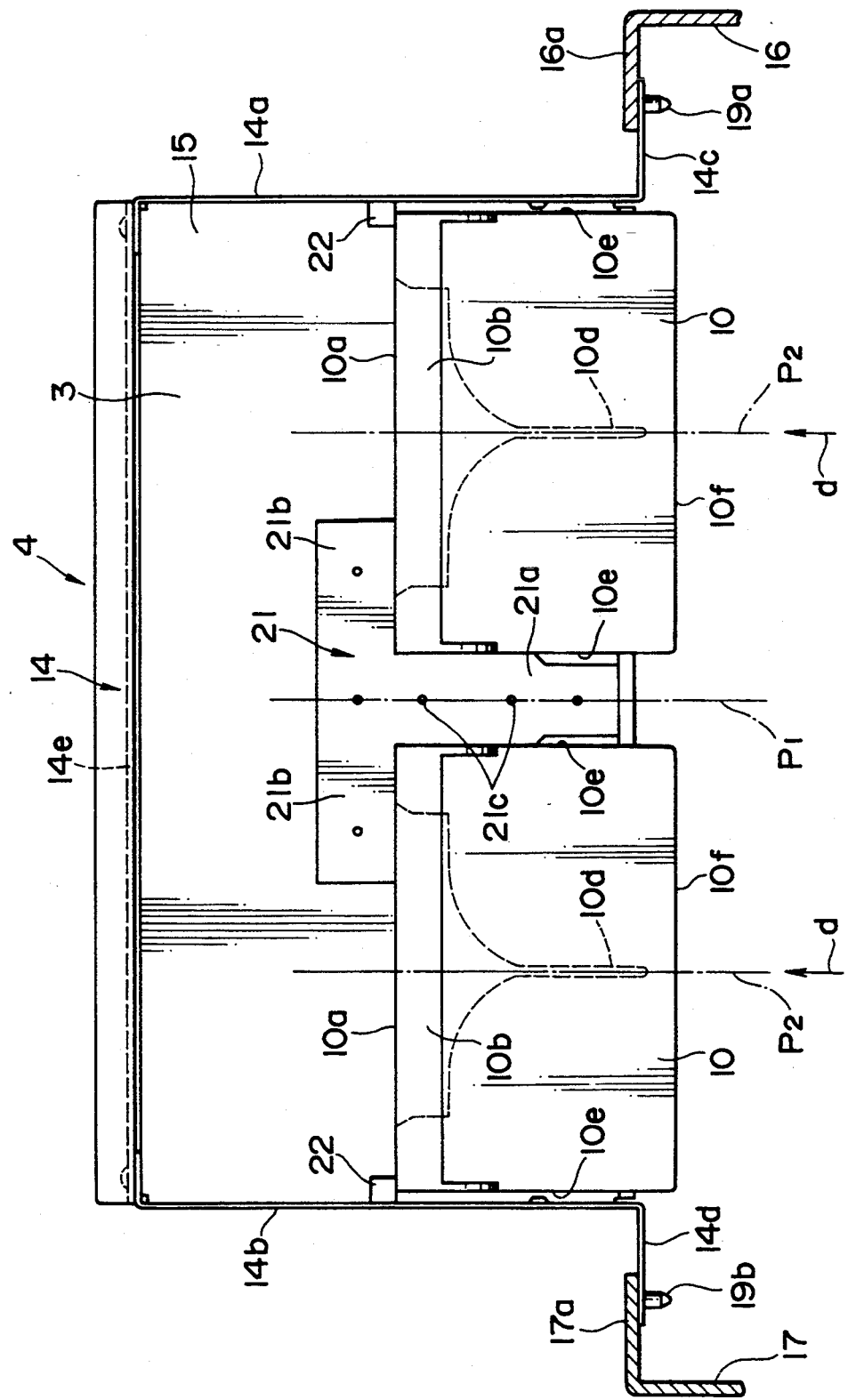
FIG. 6 is a sectional view taken along line B—B of FIG. 5 showing the cassette positioning means.

Referring to FIGS. 4 to 6, a small size cassette 10 is selectively inserted in the direction of the arrow mark d between the center plate 21a of the center guide 21 and the left or right plate 14a or 14b of the unit frame 14 on the rack plate 15 of an accommodating rack 2 and is positioned at a position $P_2$ in which the opposite left and right ends of the front face 10a thereof are abutted with the left .or right wing plate 21b of the center guide 21 and the left or right stopper 22. Thus, a pair of small size cassettes 10 can be positioned at such positions $P_2$ at which they are distributed uniformly on the left and right with respect to the rack center P1 as can be seen from FIG. 6.

Figure 7:
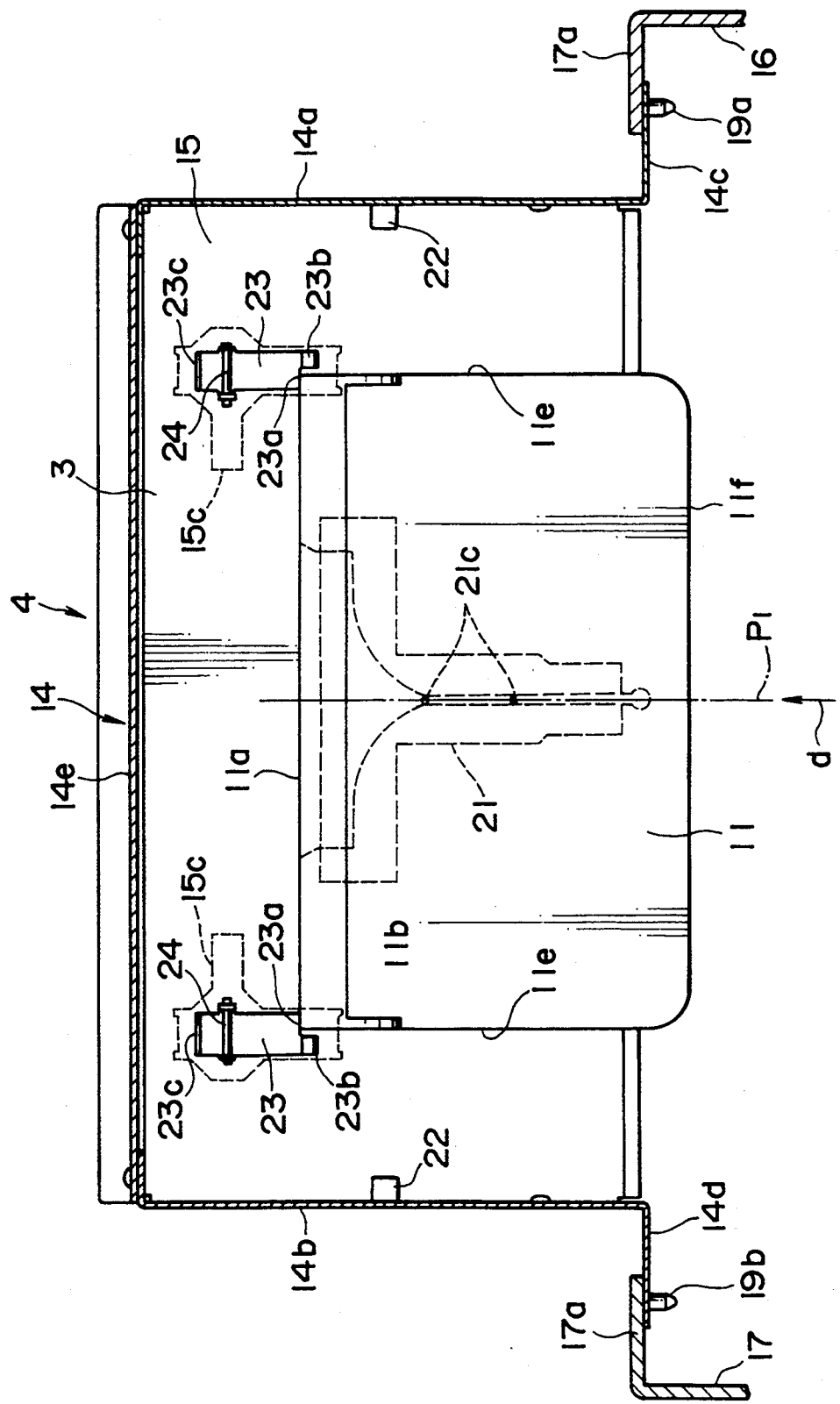
FIG. 7 is a sectional view taken along line C—C of FIG. 5 showing the cassette positioning means.

Referring now to FIGS. 4, 5 and 7, a middle size cassette 11 is selectively inserted in the direction of the arrow mark d onto the rack center $P_1$ on the center guide 21 of an accommodating rack 2 and is positioned such that the left and right side plates 11e thereof are inserted between the left and right inclined pieces 23b of the left and right movable stoppers 23 and the opposite left and right ends of the front face 11a thereof are abutted with the-left and right stopper faces 23a. In this instance, the center guide pins 21c on the center guide 21 are inserted relatively into the center groove 11d of the bottom face 11c of the middle size cassette 11 so that the middle size cassette 11 is positioned on the rack center $P_1$.

Figure 8:
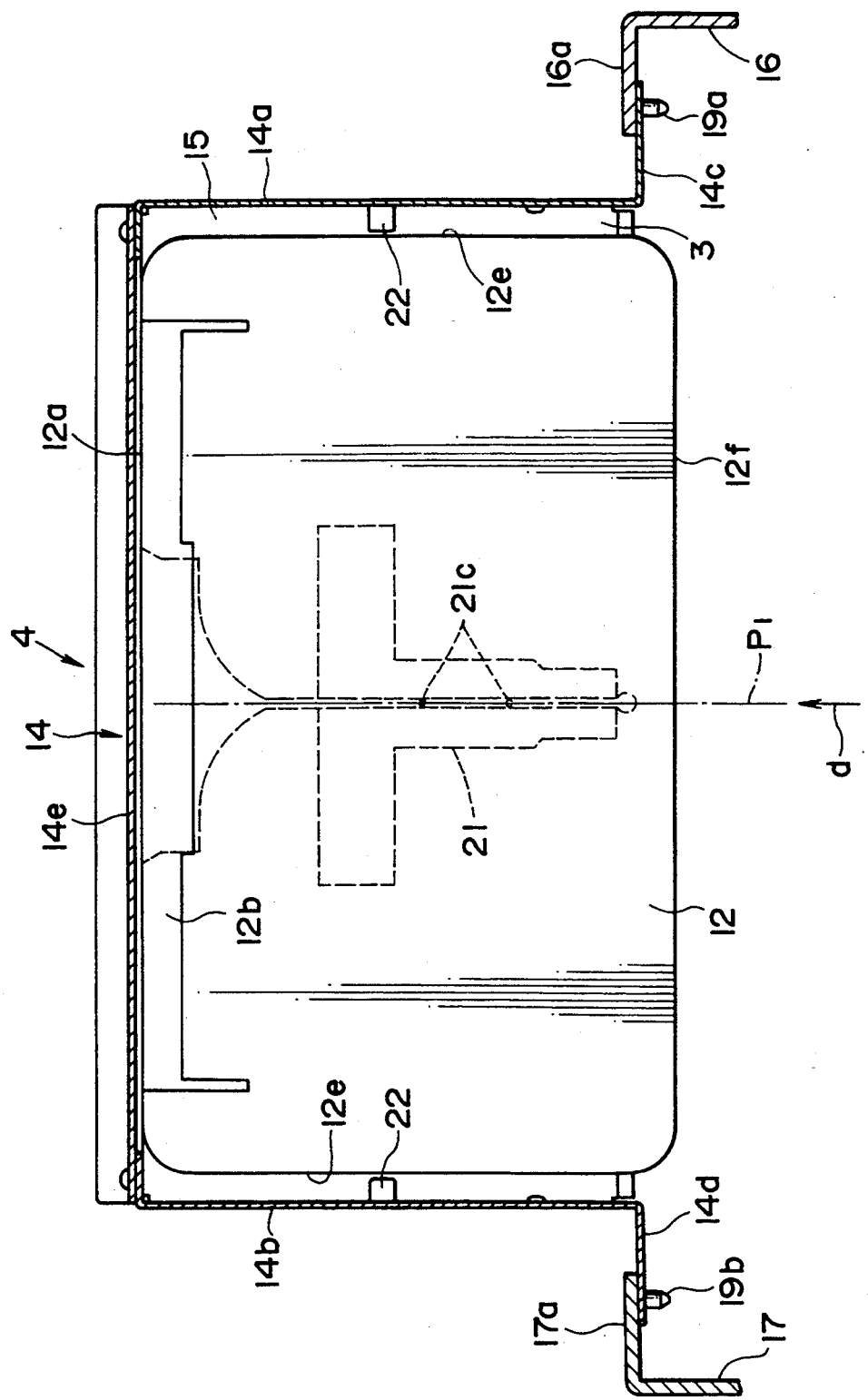
FIG. 8 is a sectional view taken along line D—D of FIG. 5 showing the cassette positioning means.

Referring now to FIGS. 4, 5 and 8, a large size cassette 12 is selectively inserted in the direction of the arrow mark d on the rack center $P_1$ onto the center guide 21 of an accommodating rack 2 and the left and right cassette tables 15a between the left and right stoppers 22 and is positioned at a position at which the front face 12a thereof is abutted with the rear face plate 14e of the unit frame 14. It is to be noted that, in this instance, the inclined pieces 23b of the left and right movable stoppers 23 are abutted relatively with the front face of the large size cassette 12, and by a guiding action of the inclined pieces 23b themselves, the left and right movable stoppers 23 are automatically pivoted to escape in the direction indicated an arrow mark h as shown in FIG. 5. Further, the center guide pins 21c on the center guide 21 are inserted relatively into the center groove 12d of the bottom face 12c of the large size cassette 12 so that the large size cassette 12 is positioned on the rack center P1.

As described so far, all of the accommodating racks 3 are constructed with the same structure so that the small, middle and large size cassettes 10, 11 and 12 can be selectively positioned and accommodated at different positions from each other in all of the accommodating racks 3. However, the accommodating racks 3 and the small, middle and large size cassettes 10, 11 and 12 are constructed such that, as seen from FIG. 5, rear faces 10f, 11f and 12f of the small, middle and large size cassettes 10, 11 and 12 extend by a fixed projection amount T1 from the front faces 4a of the rack units 4.

Cassette Detecting Apparatus in Accommodating Racks

Subsequently, cassette detecting apparatus for detecting the sizes and the accommodation positions of the small, middle and large size cassettes 10, 11 and 12 selectively accommodated in the accommodating racks 3 will be described with reference to FIGS. 10 to 13.

A pair of photo-sensors 26, another photo-sensor 27 and a further photo-sensor 28 are provided in each of the accommodating racks 3 for detecting the sizes and the accommodation positions of small, middle and large size cassettes 10, 11 and 12 selectively accommodated in the accommodating rack 3. Each of the photo-sensors 26, 27 and 28 is constituted from a light emitting element 26a, 27a or 28a and a light receiving element 26b, 27b or 28c. The light emitting elements 26a, 27a and 28a may be, for example, light emitting diodes, and the light receiving elements 26b, 27b and 28b may be, for example, phototransistors.

A pair of sensor base plates 29a and 29b are mounted and extend vertically in parallel to each other on the opposite right and left sides (outer sides) of the vertical right and left side plates 14a and 14b of the unit frame 14 of each rack unit 4 by means of a plurality of screws 31 with a plurality of spacers 30 interposed between the sensor base plates 29a and 29b and the vertical right and left side plates 14a and 14b, respectively. The light emitting elements 26a, 27a and 28a and the light receiving elements 26b, 27b and 28b of the photo-sensors 26, 27 and 28 are mounted at opposing faces of the sensor substrates 29a and 29b at four vertical positions $P_3$ to $P_6$ which oppose to the opposite left and right sides of the four accommodating racks 3. It is to be noted that the light emitting elements 26a, 27a and 28a and the light receiving elements 26b, 27b and 28b for a same rack 3 are disposed on a same horizontal plane and mounted on (soldered to) the opposing faces of the sensor base plates 29a and 29b.

In this instance, the two photo-sensors 26 for a small size cassette 10 are disposed such that the light emitting elements 26a and the light receiving elements 26b individually paired with the former are mounted perpendicularly in a left-and-right symmetrical relationship on the sensor base plates 29a and 29b with one light light emitting element and one light receiving element disposed on each of the sensor base plates 29a and 29b and are opposed in oblique directions to each other so that light beams between them intersect with the front faces of a pair of left and right small size cassettes 10 within the range of a light receiving angle $\theta_1$ of 10° to 20° of the light receiving elements 26b. Meanwhile, each of the photo-sensors 27 and 28 for middle and large size cassettes 27b and 28b is constructed such that the light emitting element 27a or 28a and the light receiving element 27b or 28b are disposed at positions on the sensor base plates 29b and 29b adjacent the front face 11a or 12a side of the middle or large size cassette 11 or 12 so as to be opposed just to each other.

Since the totaling four photo-sensors including the two photo-sensors 26 for a small size cassette 10 and the photo-sensors 27 and 28 for middle and large size cassettes 11 and 12, respectively, are disposed at the four vertical positions $P_3$ to $P_6$ of each rack unit 4, the total number of photo-sensors mounted on each rack unit 4 is 16. Accordingly, the sensor base plates 29a and 29b are constructed as common base plates for the totaling 32 light emitting elements 26a, 27a and 28a and light receiving elements 26b, 27b and 28b of the totaling 16 photo-sensors 26, 27 and 28.

Totaling 32 light transmission holes 32 are formed in the right and left plates 14a and 14b of each rack unit 4 such that they individually oppose to the totaling 32 light emitting elements 26a, 27a and 28a and light receiving elements 26b, 27b and 28b.

Detection of Cassette in Accommodating Rack

Subsequently, detection of the size and the accommodation position of a small, middle or large size cassette 10, 11 or 12 in an accommodating rack 3 will be described. It is to be noted that a detecting operation is performed by successively lighting up the light emitting elements 26a, 27a and 28b of the photo-sensors 26, 27 and 28.

Figure 11:
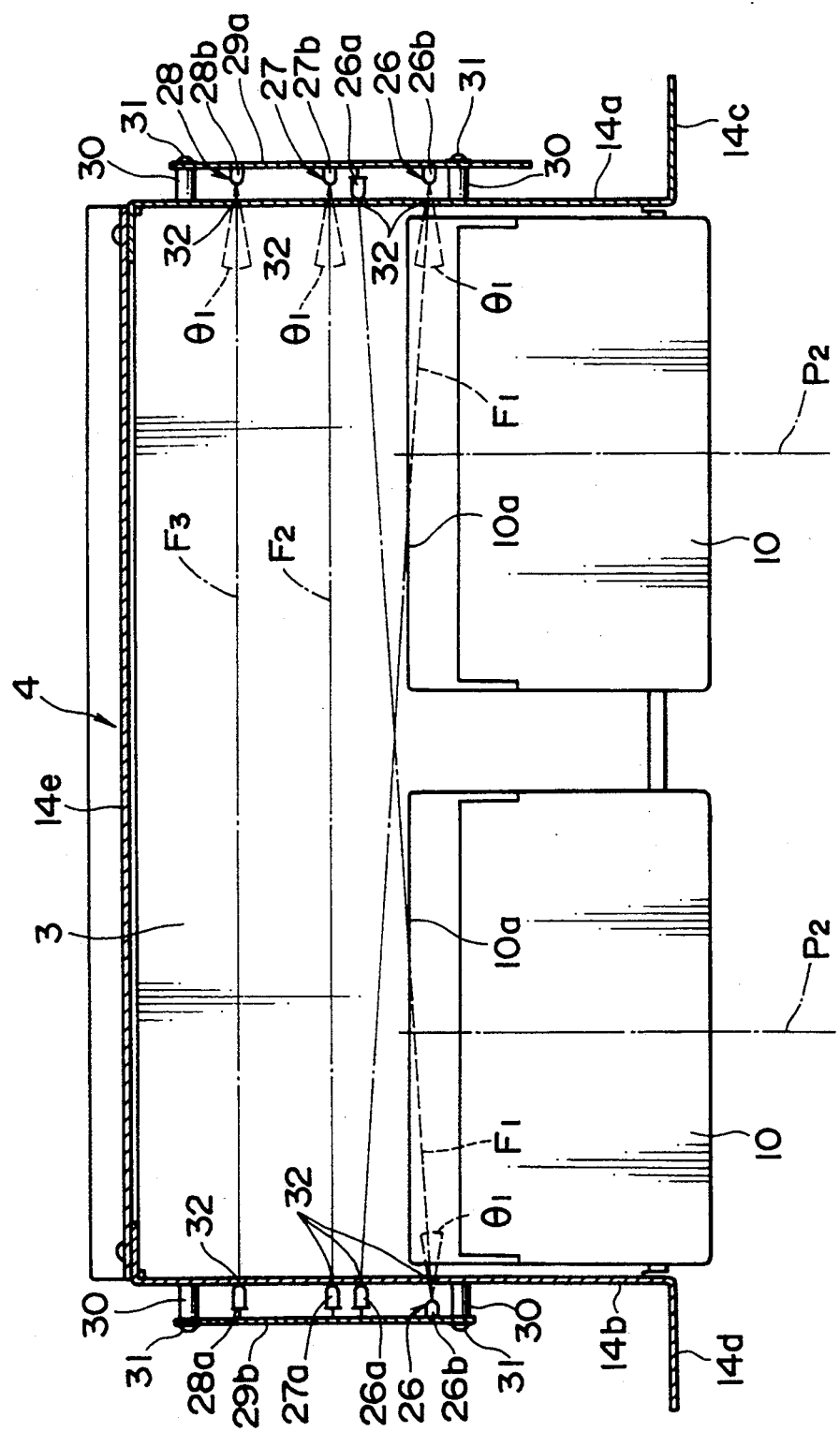
FIG. 11 is a sectional view taken along line F—F of FIG. 9 showing the cassette detecting photo-sensor.

First, when a lair of small size cassettes 10 are selectively accommodated into an accommodating rack 3 as shown in FIG. 11 and positioned correctly at the positions $P_2$ distributed uniformly to the left and right described hereinabove with reference to FIG. 6, two light paths $F_1$, along which two beams of light pass obliquely from the two light emitting elements 26a of the two photo-sensors 26 in the mutually opposite directions toward the two light receiving elements 26b, are both intercepted by the front faces 10a of the left and right small size cassettes 10 so that both of the two photo-sensors 26 are turned off. Meanwhile, parallel light paths $F_2$ and $F_3$, along which two beams of light pass from the light emitting elements 27a and 28a to the light receiving elements 27a and 28b of the other two photo-sensors 27 and 28, respectively, are not intercepted at all so that the two photo-sensors 27 and 28 are turned on. It is to be noted that, when only one small size cassette 10 is accommodated into the accommodating rack 3, only one of the two photo-sensors 26 is turned off.

Since the photo-sensors 26 are turned off and the photo-sensors 27 and 28 are turned on in this manner, it is detected that the size of the cassettes accommodated in the accommodating rack 3 is that of a small size cassette 10 and the accommodation positions of the small size cassettes 10 are correct.

Figure 12:
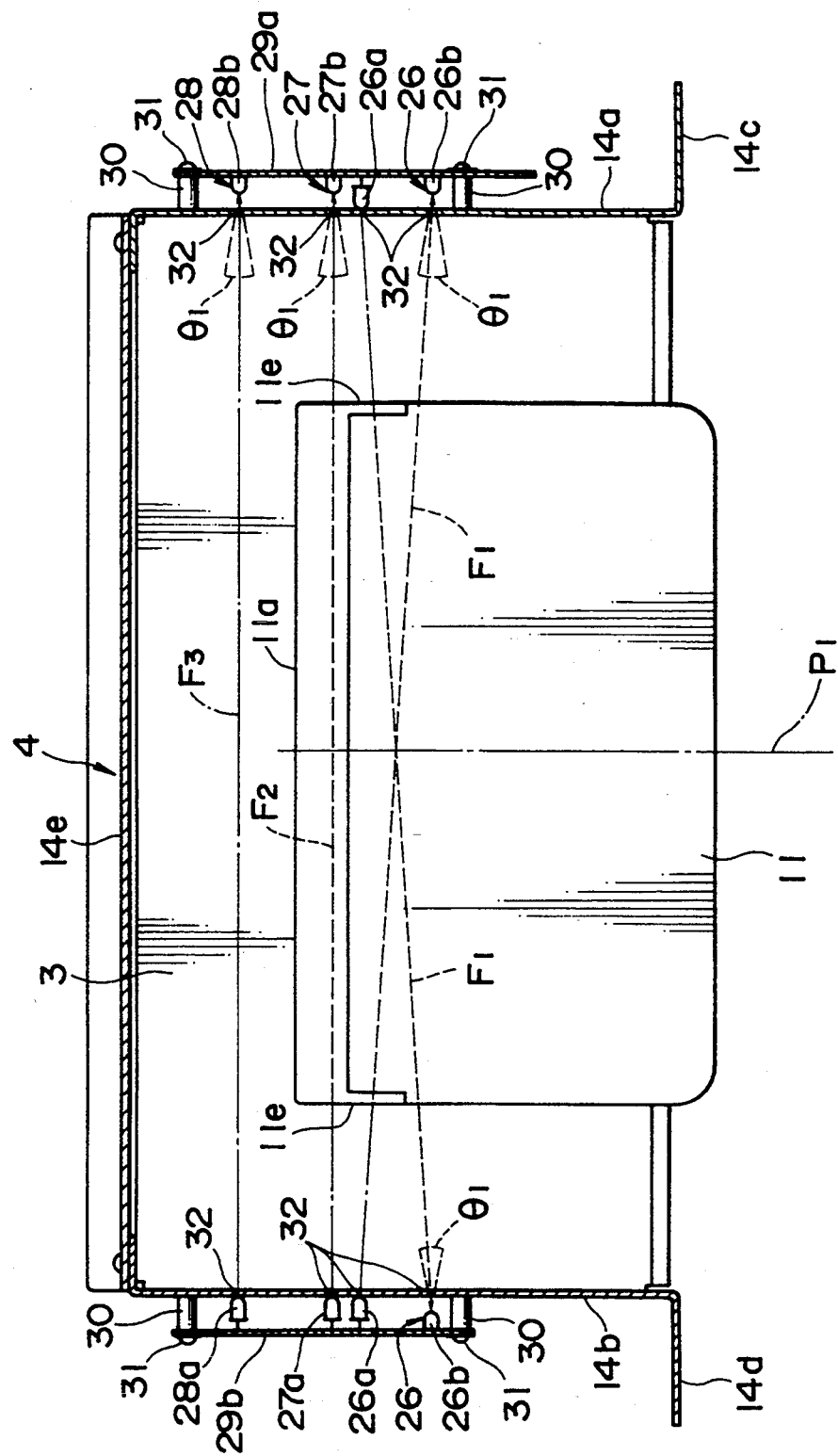
FIG. 12 is a sectional view taken along line G—G of FIG. 9 showing the cassette detecting photo-sensor.

On the other hand, when a middle size cassette 11 is selectively accommodated into an accommodating rack 3 as shown in FIG. 12 and positioned correctly at the rack center P1 described hereinabove with reference to FIG. 7, the light paths $F_1$ and $F_2$ along which beams of light pass from the light emitting elements 26a and 27a to the light receiving elements 26b and 27b of the photo-sensors 26 and 27 are intercepted by the opposite left and right side faces 11e of the middle size cassette 11 so that both of the photo-sensors 26 and 27 are turned off. Meanwhile, the light path $F_3$ along which a beam of light pass from the light emitting element 28a to the light receiving element 28b of the other photo-sensor 28 is not intercepted at all, and consequently, the photo-sensor 28 is turned on.

In this manner, as both of the photo-sensors 26 and 27 are turned off and the photo-sensor 28 is turned on, it is detected that the size of the cassette accommodated in the accommodating rack 3 is that of a middle size cassette 11 and the accommodation position of the middle size cassette 11 is correct.

Figure 13:
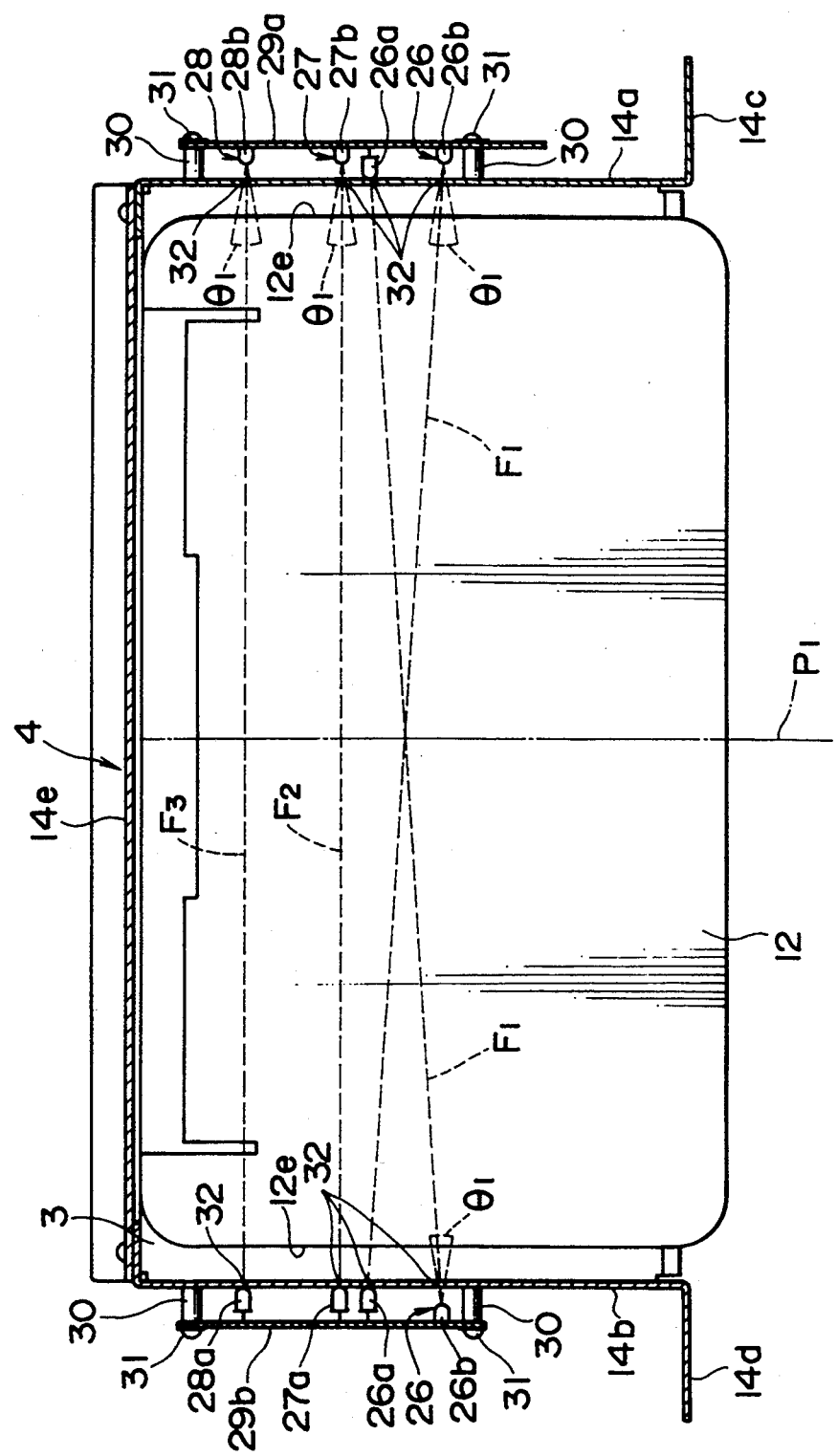
FIG. 13 is a sectional view taken along line H—H of FIG. 9 showing the cassette detecting photo-sensor.

Furthermore, when a large size cassette 12 is selectively accommodated into an accommodating rack 3 as shown in FIG. 13 and positioned correctly at the rack center P1 described hereinabove with reference to FIG. 8, all of the light paths $F_1$, $F_2$ and $F_3$ along which beams of light pass from the light emitting elements 26a, 27a and 28a to the light receiving elements 26b, 27b and 28b of all of the photo-sensors 26, 27 and 28 are intercepted by the opposite left and right side faces 12e of the large size cassette 12 so that all of the photo-sensors 26, 27 and 28 are turned off.

As all of the photo-sensors 26, 27 and 28 are turned off in this manner, it is detected that the size of the cassette accommodated in the accommodating rack 3 is that of a large size cassette 12 and the accommodation position of the large size cassette 12 is correct.

As described above, since the size and the accommodation position of any of small, middle and large size cassettes 26, 27 and 28 selectively accommodated in an accommodating rack 3 can be detected only by means of the photo-sensors 26, 27 and 28 mounted on the opposite left and right sides of the accommodating racks 3, there is no necessity of employing a shutter plate of the rotational type at all. Besides, common base plates for the totaling 32 light emitting elements 26a, 27a and 28a and light receiving elements 26b, 27b and 28b of the totaling 16 photo-sensors 26, 27 and 28 can be constructed (used as sensor base plates) from the only two sensor base plates 29a and 29b for each rack unit 4 having the four accommodating racks 3 disposed in a vertical column, and the number of sensor base plates can be reduced significantly. Further, only by mounting the only two sensor base plates 29a and 29b on the opposite right and left side plates 14a and 14b of the rack unit 4, assembly of the totaling 32 light emitting elements 26a, 27a and 28a and light receiving elements 26b, 27b and 28b can be completed, and accordingly, the number of assembling steps can be reduced remarkably and wiring of wiring lines onto the two sensor base plates 29a and 29b is simplified very much.

Further, particularly with regard to the two photo-sensors 26 for a small size cassette 10, since the oblique light paths F1 are formed making use of the light receiving angle $\theta_1$ of 10° to 20° of the light receiving elements 26b, the light emitting elements 26a and the light receiving elements 26b of the photo-sensors 26 can be mounted horizontally and perpendicularly on the sensor base plates 29a and 29b similarly to the light emitting elements 27a and 28a and the light receiving elements 27b and 28b of the other photo-sensors 27 and 28. Accordingly, the sensor base plates 29a and 29b can be mounted in parallel to each other on the opposite right and left side plates 14a and 14b of the rack unit 4, respectively, and accordingly, also mounting of the sensor base plates 29a and 29b is simplified very much.

Apparatus for Mounting Rack Units, Video Tape Recorders and Transporting Machine on Changer Body Subsequently, an apparatus for mounting the rack units 4, the video tape recorders 5 and the transporting machine 7 in the inside of the changer body 1 and the transporting machine feeding apparatus 8 will be described with reference to FIGS. 1 to 3, 14 and 15.

Referring first to FIGS. 1 to 3, the mounting reference plate 16 and the auxiliary mounting plate 17 described above are securely mounted on the inner faces of front portions (portions in the direction of the arrow mark e in FIG. 3) of the opposite right and left side frames 1a and 1b of the changer body 1 and extend perpendicularly in parallel to each other along the overall height of the changer body 1. A pair of right and left support posts 34a and 34b are securely mounted on the inner faces of rear portions (portions in the direction of the arrow mark e in FIG. 3) of the opposite right and left side frames 1a and 1b, respectively, and extend vertically in parallel to each other. The horizontal sections of the mounting reference plate 16 and the auxiliary mounting plate 17 have substantially channel shapes substantially symmetrical with each other. The left and right mounting plates 14c and 14d of the unit frame 14 of the rack units 4 are positioned each by means of a pair of positioning pins 19a and 19b as described hereinabove and removably mounted each by means of a plurality of screws 18 at a pair of left and right vertical mounting portions 16a and 17a formed integrally at rear end portions (portions in the direction of the arrow mark d in FIG. 3) of the mounting reference plate 16 and the auxiliary mounting plate 17, respectively. Further, similarly to the rack units 4, a pair of left and right mounting plates 35a and 35b formed at front end portions of the two video tape recorders 5 are positioned at lower end portions of the left and right mounting portions 16a and 17a each by means of a pair of positioning pins 19a and 19b and removably mounted each by means of a plurality of screws 18. It is to be noted that, since each of the video tape recorders 5 is very heavy in weight comparing with each of the rack units 4 and also the depth in the forward and backward direction is great, the rear end portions of the video tape recorders 5 are removably attached to the right and left support posts 34a and 34b by way of a pair of right and left slide rails 36a and 36b of the inner and outer double structure, respectively.

Accordingly, the rack units 4 and video tape recorders 5 are mounted with reference to the same mounting reference plate 16 relative to each other (it is to be noted that the auxiliary mounting plate 17 is an auxiliary mounting member at all, and only the mounting reference plate 16 makes a reference for mounting), and the relationship between the vertical positions of the accommodating racks 3 in the rack units 4 and the cassette insertion openings 5b of the video tape recorders 5 with respect to the mounting reference plate 16 can be set accurately without any adjustment.

It is to be noted that the reason why the rack units 4 and video tape recorders 5 are removably mounted on the right and left mounting portions 16a and 17a and so forth is that it is intended so that the arrangement of the rack units 5 and the video tape recorders and so forth can be modified freely.

Figure 14:
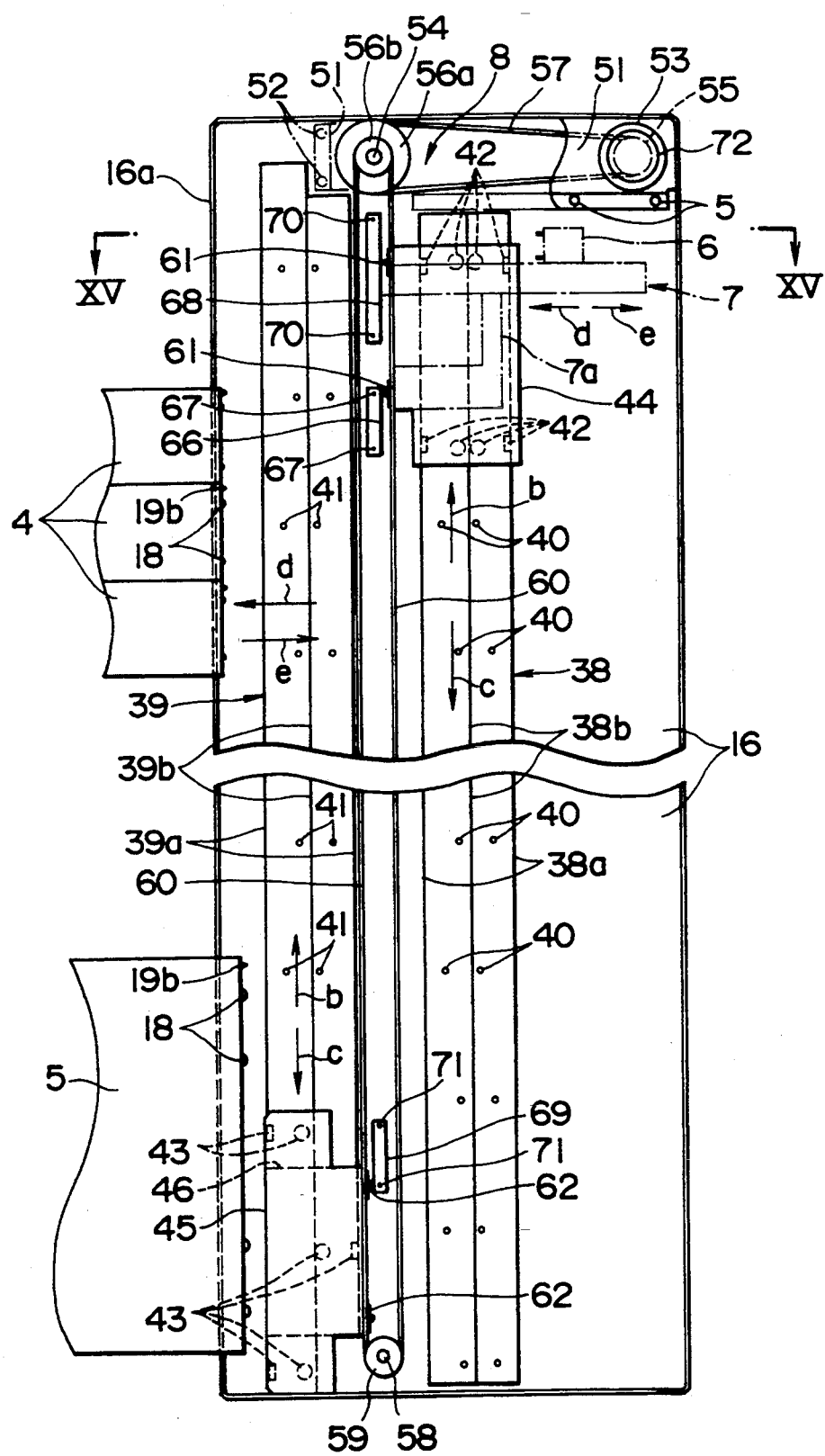
FIG. 14 is a side elevational view showing, in a somewhat enlarged scale, a mounting reference plate of the automatic cassette changer of FIG. 1.
Figure 15:
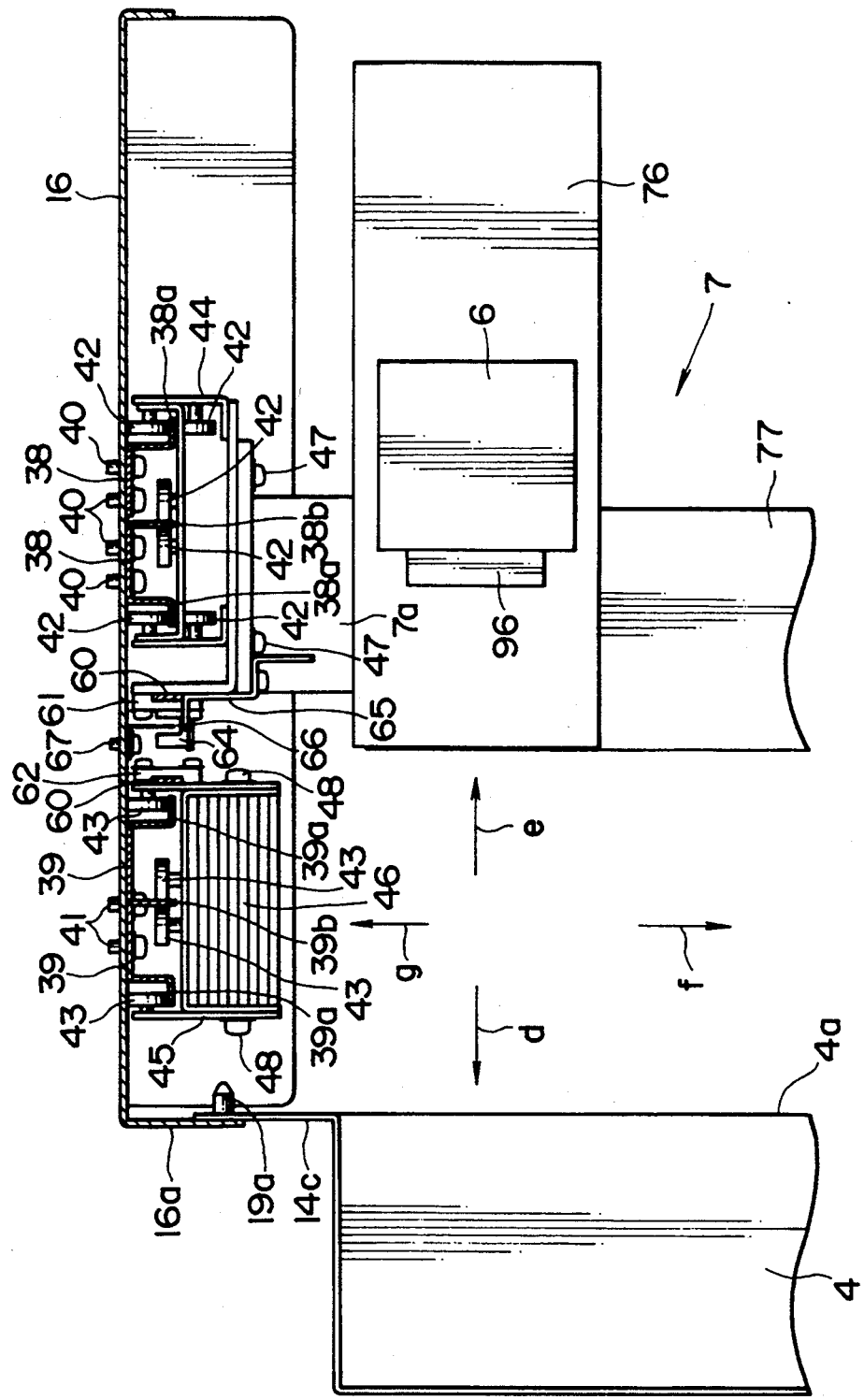
FIG. 15 is a sectional view taken along line I—I of FIG. 14.
Figure 16:
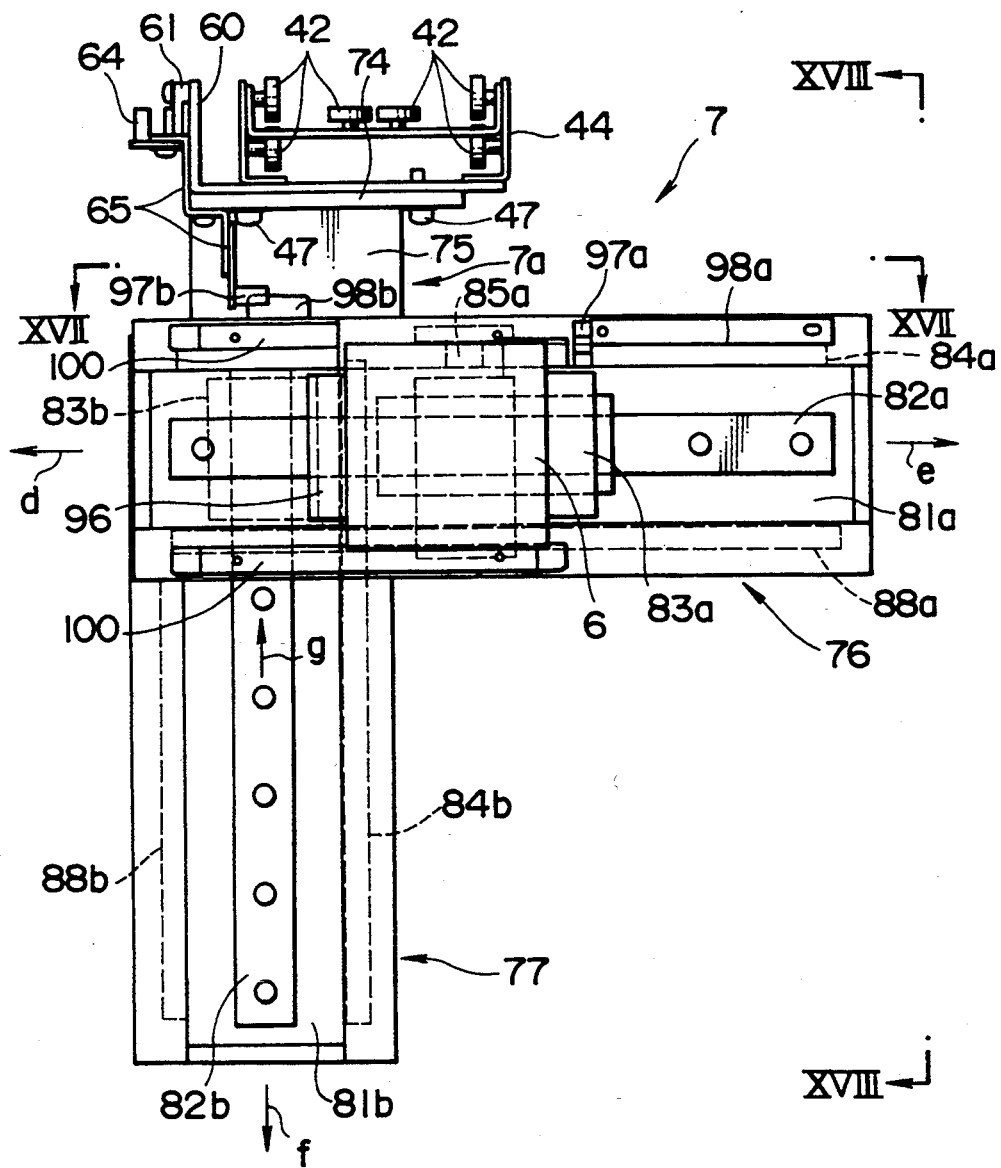
FIG. 16 is an enlarged plan view showing a transporting machine of the automatic cassette changer of FIG. 1.

Referring now to FIGS. 14 and 15, a pair of front and rear guide rail members 38 for the transporting machine 7 and another pair of front and rear guide rails 39 for a counterweight are mounted on the inner face of the single mounting reference plate 16, which has the mounting portion 16a integrally formed at a rear end portion thereof, by means of a plurality of screws 40 and 41, respectively, and extend vertically in parallel to each other. A pair of vertical guide rails 38a and 39a and another pair of guide rails 38b and 39b are formed integrally on the guide rail members 38 and 39, respectively, such that the vertical guide rails 38a and 39a are bent and extent in parallel to the forward and backward depthwise direction (direction of the arrow mark d or e in FIG. 15) of the changer body 1 and the guide rails 38b and 39b are bent and extend in parallel to the leftward and rightward direction (direction of the arrow mark f or g in FIG. 15) of the changer body 1.

A pair of sliders 44 and 45 are mounted on the guide rails 38a, 38b and 39a, 39b without a play by means of a plurality of guide rollers 42 and 43, respectively, such that they can travel vertically in the vertical directions of the arrow marks b and c in FIG. 14 along the guide rails 38a, 38b and 39a, 39b. A machine body 7a of the transporting machine 7 and a counterweight 46 for balancing with the weight of the transporting machine 7 are securely mounted on the sliders 44 and 45 by means of a plurality of screws 47 and 48, respectively.

The transporting machine feeding apparatus 8 is mounted on the inner side of the same mounting reference plate 16. The transporting machine feeding apparatus 8 is includes a motor 53 and a pair of timing belts 57 and 60. A motor pulley mounting plate 51 is securely mounted on and extends horizontally perpendicularly to the inner face of an upper end of the mounting reference plate 16 by means of a plurality of screws 52, and the motor 53 and an intermediate shaft 54 are mounted at the opposite ends of the motor pulley mounting plate 51 in the forward and backward directions (directions of the arrow marks d and e). A driving timing belt 57 extends horizontally between and around a motor pulley 55 of the motor 53 and an intermediate pulley 56a mounted for rotation on the intermediate shaft 54. A support shaft 58 is mounted at a position on the inner face of a lower end of the mounting base plate 16 just below the intermediate shaft 54, and a transporting timing belt 60 extends vertically between and around another intermediate pulley 56b integrated with the intermediate pulley 56a and a pulley 59 mounted for rotation on the support shaft 58. The transporting timing belt 60 is disposed between the sliders 44 and 45. Portions of the timing belts 60 in the direction of the arrow mark e and the direction of the arrow mark d are secured to the sliders 44 and 45 by means of a pair of upper and lower belt securing portions 61 and 62, respectively.

A photo-sensor 64 such as a photocoupler for detecting an access reference point for automatic cassette exchange of the transporting machine 7 with the accommodating racks 3 and video tape recorders 5 is mounted on the transporting machine body 7a by way of a bracket 65. A first shutter plate 66, which serves as a detection section for an access reference point to be detected by the photo-sensor 64, is securely mounted on and extends vertically from the inner face of an upper end portion of the mounting reference plate 16 by means of a plurality of screws 67. It is to be noted that second and third shutter plates 68 and 69 for detecting an upper limit and a lower limit of the transporting machine 7 are securely mounted on and extend vertically from the inner face of the mounting reference plate 16 above and below the first shutter plate 66 by means of a plurality of screws 70 and 71, respectively.

According to the present transporting machine feeding apparatus 8, when the motor 53 is energized to rotate forwardly or reversely, the timing belt 60 is driven to travel in the upward or downward direction as indicated by the arrow mark b or c by way of the timing belt 57 to transport the transporting machine 7 in the direction of the arrow mark b or c. In this instance, the counterweight 46 is driven to travel in the direction of the arrow mark c or b in the opposite direction to that of the transporting machine 7 to balance with the weight of the transporting machine 7 so as to allow the transporting machine 7 to transport at a high speed.

When an accessing operation for automatic exchange of any of the small, middle and large size cassettes 10, 11 and 12 accommodated at random in the accommodating racks 3 with the video tape recorders 5 is to be performed, the access reference point is first detected by detection of the-first shutter plate 66 by means of the photo-sensor 64. Then, an automatic cassette exchanging operation including an automatic cassette loading operation wherein amounts by which the transporting machine 7 should move in the direction of the arrow mark c from the access reference point to designated ones of the accommodating racks 3 and the video tape recorders 5 are detected by means of an encoder 72 mounted on the motor 53 or some other element and a designated one of the small, middle and large size cassettes 10, 11 and 12 in the designated accommodating rack 3 is selectively drawn out, transported to the designated video tape recorder 5 and automatically inserted into the cassette insertion opening 5b by means of the hand 6 of the transporting machine 7 and an automatic cassette returning operation which is a reverse operation to the automatic cassette inserting operation is performed.

Since the mounting portions 16a for the accommodating racks 3 and video tape recorders 5, the guide rails 38a and 38b for the transporting machine 7 and the first shutter plate 66 which is a detection portion of the access reference point by the photo-sensor 64 for automatic cassette exchange of the transporting machine 7 with regard to the accommodating racks 3 and video tape recorders 5 are provided on the single mounting reference plate 16 as described so far, the positional relationship between the accommodating racks 3 and video tape recorders 5 with respect to the access reference point at which the first shutter plate 66 is mounted and the transporting machine 7 in the direction of the arrow mark b or c and the direction of the arrow mark d or e can be set accurately without any adjustment. Then, upon accessing of the transporting machine 7 for automatic cassette exchange, since control of the amount of movement of the transporting machine 7 with respect to the access reference point in the direction of the arrow mark b or c can be controlled accurately using the encoder 72 by detection only of the first shutter plate 66 by means of the photo-sensor 64, the access control of the transporting machine 7 can be performed accurately by a simple access controlling circuit. Further, since the positional relationship between the photo-sensor 64 of the transporting machine 7 and the first, second and third shutter plates 66, 68 and 69 in the directions of the arrow marks d and e can be set accurately without any adjustment, there is no necessity at all of performing position adjustment of the photo sensor 64 and the first, second and third shutter plates 66, 68 and 69 in the directions of the arrow marks d and e, and accordingly, assembly is very simple. Further, there is no necessity at all for provision of a plurality of shutter plates for detection of an initial reference point on the accommodating racks 3 and video tape recorders 5.

Hand Feeding Mechanism of Transporting Machine

Referring now to FIGS. 16 to 20, the machine body 7a of the transporting machine 7 generally has a substantially T-shape as viewed from a side and includes a mounting plate 74 mounted on the slider 44 by means of a plurality of screws 47 and a support table 75 securely mounted on and extending horizontally perpendicularly from the mounting plate 74 in parallel to the directions of the arrow marks f and g. A first hand feeding mechanism 76 for feeding the hand 6 horizontally linearly in the direction of the arrow mark d or e, which is a cassette removing or inserting direction, and a second hand feeding mechanism 77 for feeding the hand 6 horizontally linearly in the direction of the arrow mark f or g, which is a direction perpendicular to the cassette removing or inserting direction, are mounted in an overlapping relationship at upper portions of the support table 75 and extend perpendicularly to each other.

The first and second hand feeding mechanisms 76 and 77 are constructed with the same structure such that first sliders 81a and 81b are mounted for sliding movement in the directions of the arrow marks d, e and f, g by way of guide rail receivers 79a and 79b and guide rails 80a and 80b on and extend horizontally from slider bases 78a and 78b, respectively, and second sliders 83a and 83b are mounted for sliding movement in the same directions by way of guide rails 82a and 82b on and extend horizontally from the first sliders 81a and 81b, respectively. The slider base 78b of the second hand feeding mechanism 77 is securely mounted on the support table 75 of the transporting machine body 71 and extend horizontally in parallel to the directions of the arrow marks f and g, and the slider base 78a of the first hand feeding mechanism 76 is securely mounted on the second slider 83b of the second hand feeding mechanism 77 and extent horizontally in parallel to the directions of the arrow marks d and e while the hand 6 is mounted on the second slider 83a of the first hand feeding mechanism 76 and extend in parallel to the accommodating racks 3.

Driving means for the first and second hand feeding mechanisms 76 and 77 are constituted from rack and pinion mechanisms 86a and 86b including toothed racks 84a and 84b securely mounted on and extending in parallel to lower portions of the first sliders 81a and 81b on one end side and pinions 85a and 85b for driving the toothed racks 84a and 84b, respectively, and belt mechanisms 89a and 89b including timing belts 88a and 88b extending between and around pairs of pulleys 87a and 87b mounted at the opposite ends of lower portions of the first sliders 81a and 81b on the other end side and extending in parallel to the toothed racks 84a and 84b, respectively. A pair of motors 91a and 91b are mounted on side faces of a pair of gear boxes 90a and 90b securely mounted on side faces of the slider bases 78a and 78b such that the pinions 85a and 85b are driven to rotate forwardly or reversely by way of gear trains 92a and 92b in the gear boxes 90a and 90b by the motors 91a and 91b, respectively. The timing belts 88a and 88b are secured, at two upper and lower portions thereof, to the second sliders 83a and 84b and the slider bases 78a and 78b by a pair of belt securing portions 93a and 93b, respectively.

A pair of upper and lower cassette holding pawls 95 and 96 are mounted on and extend horizontally in parallel to each other from a front face 6a of the hand 6 adjacent the accommodating units 3 and the video tape recorders 5. The lower cassette holding pawl 95 is constructed as a fixed pawl while the upper cassette holding pawl 96 is driven to move up or down in the upward or downward direction of an arrow mark j or k by a lifting driving apparatus (not shown) mounted in the hand 6.

It is to be noted that the origin of the hand 6 provided by the first hand feeding mechanism 76 is set to an end position of movement thereof in the direction of the arrow mark e while the origin of the hand 6 provided by the second hand feeding mechanism 77 is set to an end position of movement thereof in the direction of the arrow mark g. The origin in the direction of the arrow mark e is detected by means of a photo-sensor 97a such as a photocoupler mounted on a side face of the hand 6 and a shutter plate 98a mounted on the first slider 81a, and the origin in the direction of the arrow mark g is detected by a photo-sensor 97b such as a photocoupler mounted on a side face of the mounting plate 74 and a shutter plate 98b mounted on a side face of the slider base 78a. Meanwhile, a pair of encoders 99a and 99b for detecting amounts of movement of the hand 6 in the direction of the arrow mark d and the direction of the arrow mark f from the respective origins described above are mounted on the motors 91a and 91b, respectively.

A pair of left and right cassette receiving tables 100 are mounted on the first slider 81a of the first hand feeding mechanism 76 and extend horizontally in parallel to each other.

Operation of Hand Feeding Mechanisms

Subsequently, a feeding operation of the hand 6 by the first hand feeding mechanism 76 in the directions of the arrow marks d and e will be described.

Figure 17:
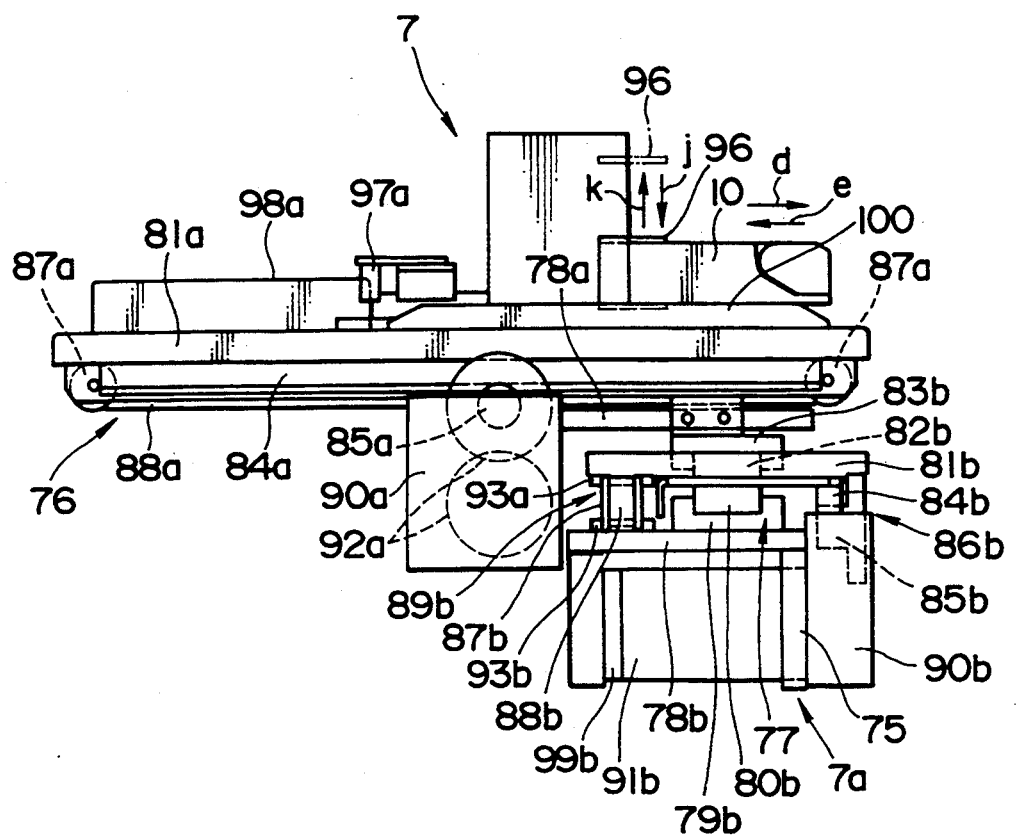
FIG. 17 is a sectional view taken along line J—J of FIG. 16.
Figure 18:
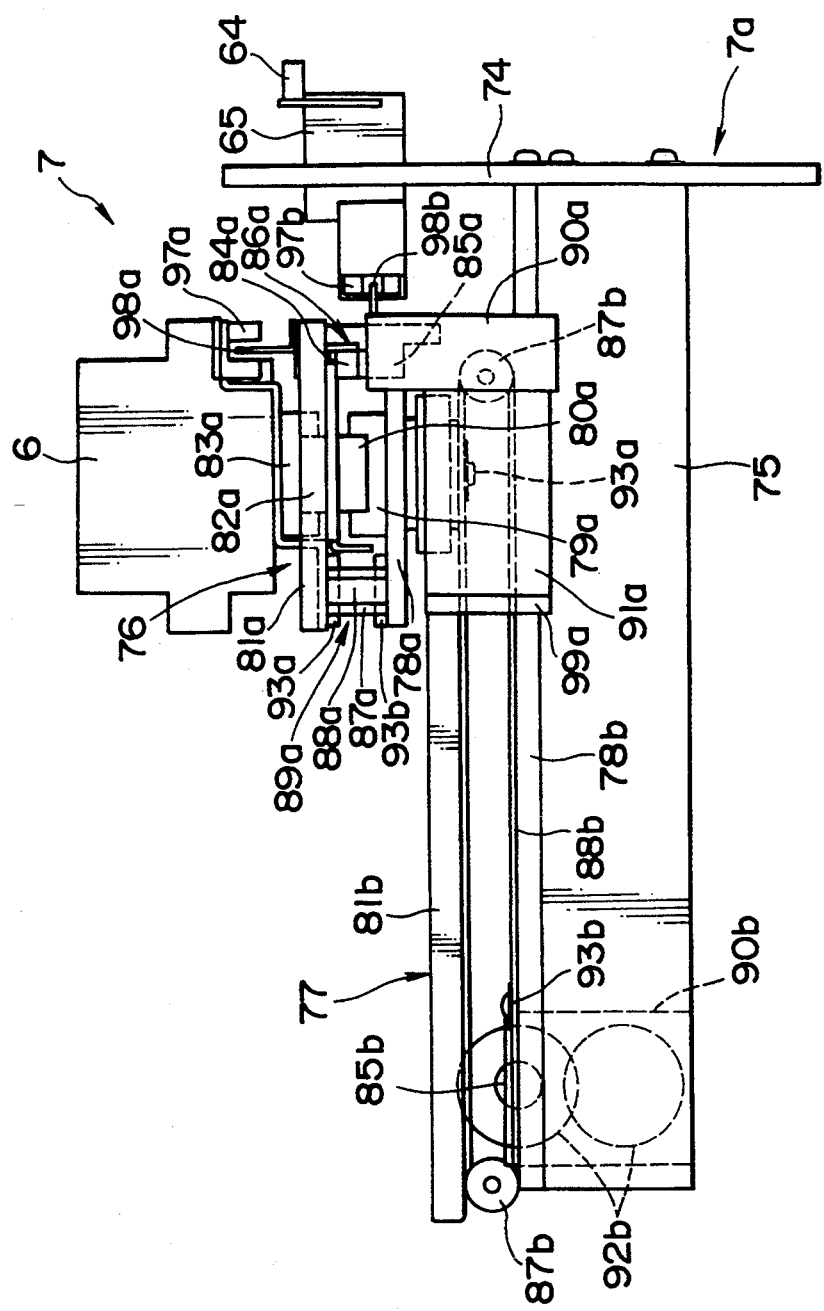
FIG. 18 is a side elevational view as viewed in the direction indicated by an arrow mark K in FIG. 16.
Figure 19:
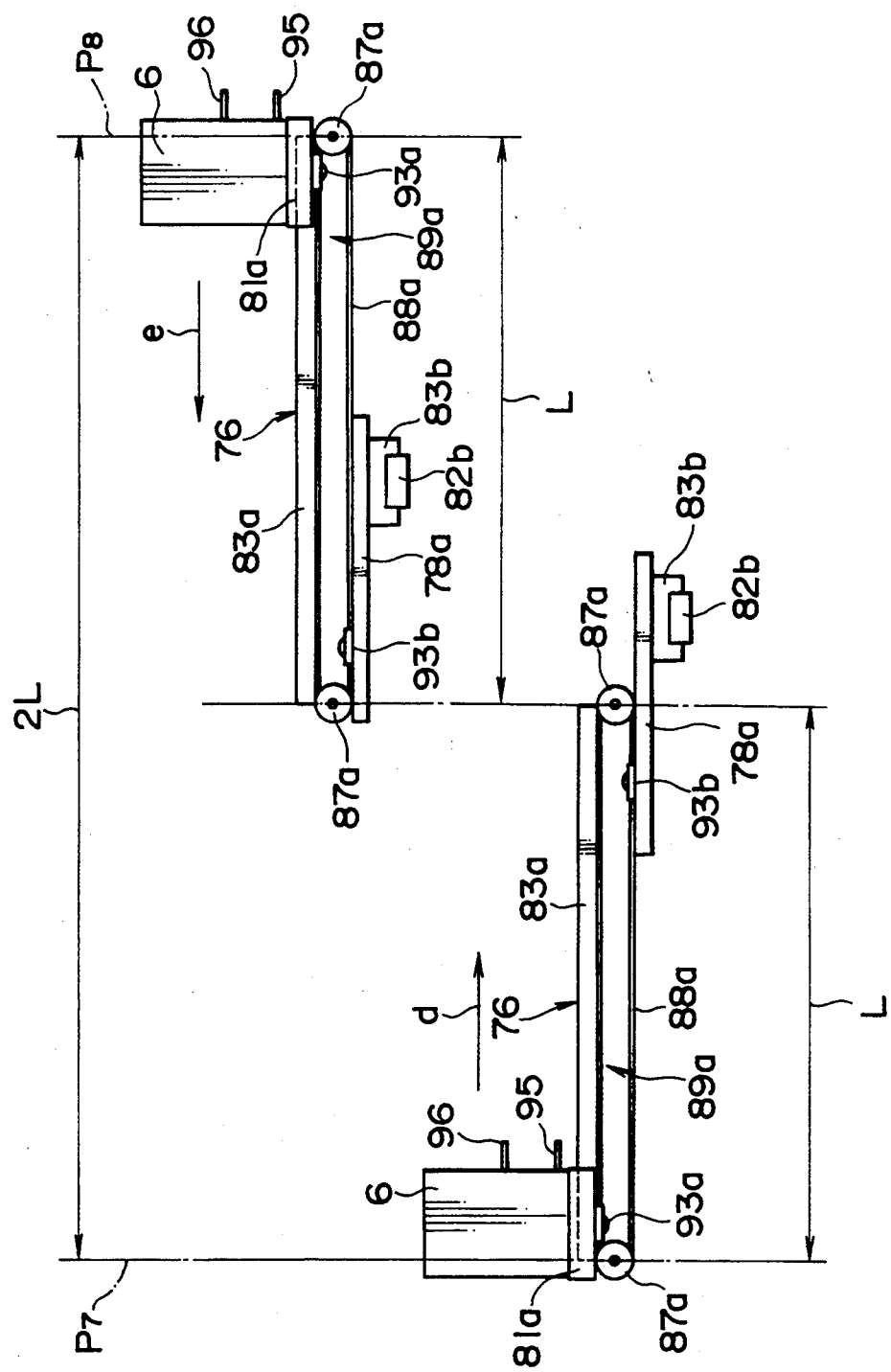
FIG. 19 is a diagrammatic view illustrating a feeding amount of a hand of the transporting machine.

First, if, in a condition wherein the hand 6 stops at the origin $P_7$ in the direction of the arrow mark e as shown at a lower stage of FIG. 19, the toothed rack 84a is driven to move in the direction of the arrow mark d in FIG. 17 by the pinion 85a which is driven by way of the gear train 92a by the motor 91a, then the first slider 81a on the slider base 78a is moved in the direction of the arrow mark d from the origin $P_7$ of FIG. 19.

The moving force of the first slider 81a in the direction of the arrow mark d is transmitted to the second slider 83a by way of the timing belt 88a so that the second slider 83a is moved simultaneously in the direction of the arrow mark d on the first slider 81a.

Then, while the hand 6 keeps its parallel posture with respect to the accommodating racks 3 and video tape recorders 5, it is fed horizontally by linear movement in the direction of the arrow mark d from the origin $P_7$ to a maximum movement position $P_8$ adjacent the accommodating racks 3 and video tape recorders 5 shown at an upper stage of FIG. 19 by the second slider 83a.

In this instance, since the first slider 81a and the second slider 83a on the first slider 81a are moved simultaneously in the direction of the arrow mark d by way of the slider base 78a by the rack and pinion mechanism 86 and the belt mechanism 89a, the hand 6 can be fed at a high speed from the origin $P_7$ of FIG. 19 to the maximum movement position $P_8$ by a movement amount 2L which is twice the movement amount L of each of the first and second sliders 81a and 81b.

It is to be noted that also the second hand feeding mechanism 77 can be fed horizontally at a high speed in the direction of the arrow mark d or e by a feeding amount which is twice the movement amount of the first and second sliders 81b and 83b while keeping the parallel posture of the hand 6 to the accommodating racks 3 and video tape recorders 5 quite similarly to the first hand feeding mechanism 76.

The movement strokes of the hand 6 in the directions of the arrow marks d and f from the origins in the directions of the arrow marks e and g can be controlled simply and accurately by the encoders 99a and 99b of the motors 91a and 91b, respectively.

According to the transporting machine 7 and the first and second hand feeding mechanisms constructed in such a manner as described above, a rear end portion (opposite portion to the front face) of a small, middle or large size cassette 10, 11 or 12 is held parallelly from above and below by and between the upper and lower cassette holding pawls 95 and 96 of the hand 6 to perform a cassette delivering operation of the small, middle and large size cassette 10, 11 or 12 in the direction of the arrow mark d or e from or to any of the accommodating racks 3 and video tape recorders 5, another selecting operation in the direction of the arrow mark f or g for selecting an accommodation position of the small, middle or large size cassette 10, 11 or 12 ($P_1$ or $P_2$ in FIGS. 11 to 13) to one of the accommodating racks 3 and a further transporting operation of the small, middle or large size cassette 10, 11 or 12 in the direction of the arrow mark b or c along the accommodating racks 3 and video tape recorders 5. It is to be noted that, in this instance, the small, middle or large size cassette 10 selectively held by the hand 6 is supported stably on the cassette receiving tables 100 to perform a cassette delivering operation in the direction of the arrow mark d or e and a cassette transporting operation in the direction of the arrow mark b or c and the direction of the arrow mark f and g.

In this instance, since the hand 6 is moved linearly in the direction of the arrow mark d or e and the direction of the arrow mark f or g while it keeps a parallel posture to the accommodating racks 3 and video tape recorders 5 by means of the first and second hand feeding mechanisms 76 and 77, the amounts of movement of the hand 6 in the direction of the arrow mark d or e and the direction of the arrow mark f or g can be controlled readily, and control of the delivery stroke in the direction of the arrow mark d or e in accordance with the size of a small, middle or L side cassette 10, 11 or 12 by the hand 6 and selection control of the accommodation position of the small, middle and large size cassette 10, 11 or 12 in the direction of the arrow mark f or g to the accommodating rack 3 can be performed readily.

For example, FIG. 20 illustrates a delivery stroke $S_3$ of a small, middle or large size cassette 10, 11 or 12 with respect to a video tape recorder 5, and since the insertion amount $S_4$ of the small, middle or large size cassette 10, 11 or 12 with respect to the video tape recorder 5 is fixed, the projection amounts $S_5$ of small, middle or large size cassettes 10, 11 and 12 from the front face 5a of the video tape recorder 5 are different from one another. Accordingly, while the cassette delivery stroke $S_3$ by the hand 6 must be controlled in accordance with the size of a small, middle or large size cassette 10, 11 or 12, control of the cassette delivery stroke $S_3$ can be performed readily by means of the encoder 99a. It is to be noted that reference character $S_6$ denotes an escape width of the hand 6 with regard to a large size cassette 12.

Meanwhile, as shown in FIG. 19, since the first and second hand feeding mechanisms 76 and 77 can linearly move the hand 6 in the directions of the arrow marks d or e and f or g by a movement amount 2L which is twice the movement amount L $\ominus$f the first and second sliders 81a, 81b and 83a, 83b, while the hand 6 can make a linear movement by a very large stroke, the lengths of the first and second sliders 81a, 81b and 83a, 83b can be reduced to one half the movement amount 2L of the hand 6, and reduction in size and weight of the transporting machine 7 can be achieved.

Further, when a small, middle or large size cassette 10, 11 or 12 selectively held by the hand 6 is to be delivered in the direction of the arrow mark d or e, it can be supported stably in a horizontal posture on the cassette receiving tables 100 which are mounted on and extent horizontally in parallel to each other from the first slider 81 of the first hand feeding mechanism 76. Further, a small, middle or large size cassette 10, 11 or 12 selectively held by the hand 6 can be transported in the direction of the arrow mark b or c and the direction of the arrow mark f or g in a condition wherein it is supported stably on the cassette receiving tables 100. Accordingly, it is possible to raise the feeding speed of a small, middle or large size cassette 10, 11 or 12 in the direction of the arrow mark b or c, the direction of the arrow mark d or e and the direction of the arrow mark f or g to assure automatic cassette exchange at a high speed and enhance the safety then.

Automatic Refuge Controlling Circuit for Transporting Machine

Figure 21:
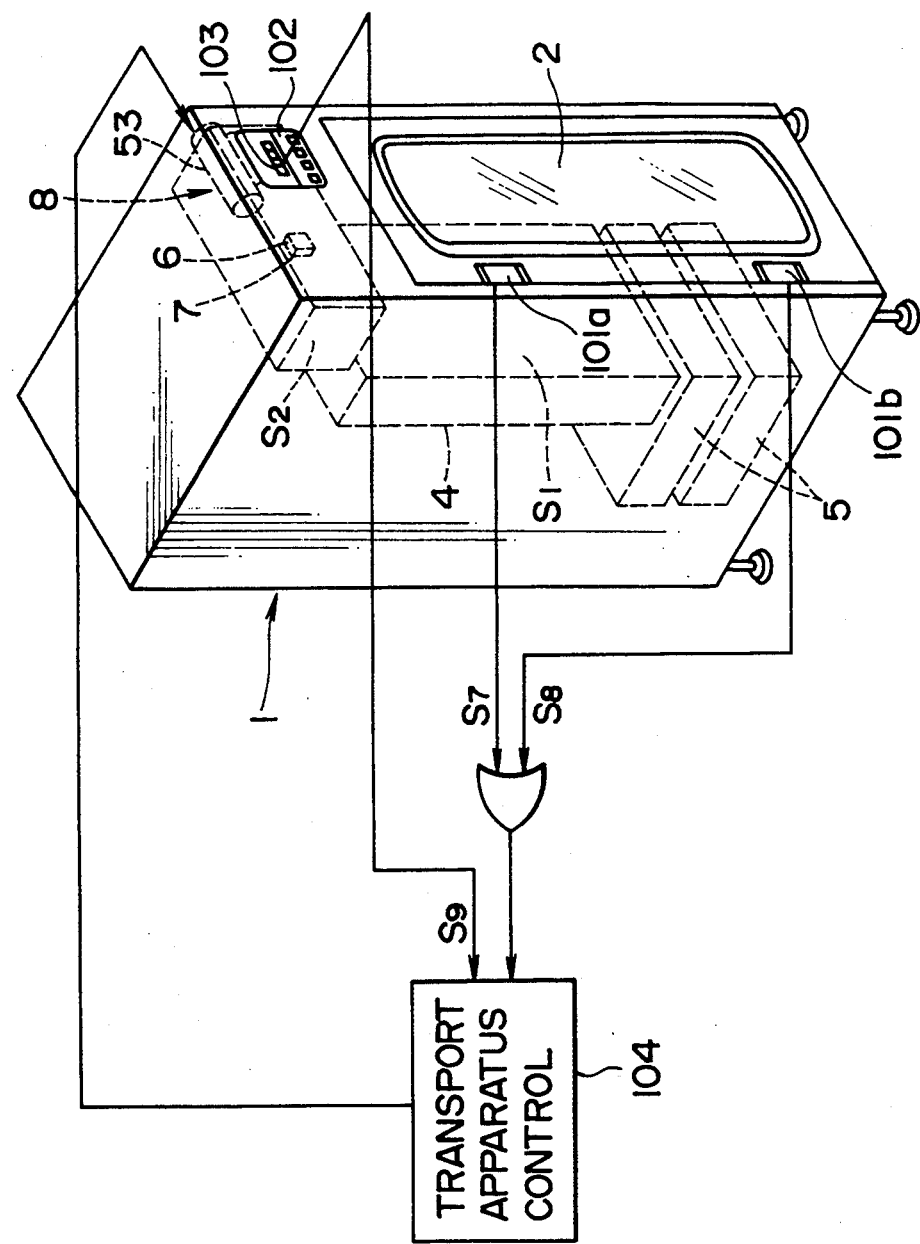
FIG. 21 is a schematic diagrammatic view showing a controlling circuit for the transporting machine.

Subsequently, a controlling circuit for automatically retracting the transporting machine 7 from within the transportation space $S_1$ to the refuge space $S_2$ shown in FIGS. 1 and 2 will be described with reference to FIG. 21.

A pair of upper and lower closed door locking apparatus 101a and 101b ace provided on the changer body 1 for locking the hinged door 2, which is provided to open or close the front face of the changer body 1, in the closed condition, and a pair of open door detection switches (not shown) are incorporated in the closed door locking apparatus 101a and 101b such that they are switched on in response to unlocking of the closed door. An operation panel 102 is provided at an upper right corner portion of the front face of the changer body 1, and a further open door detection switch 103 is mounted on the operation panel 102. Output signals $S_7$ and $S_8$ of the open door detection switches incorporated in the closed door locking apparatus 101a and 101b are inputted by way of an OR circuit 105 to an input terminal of a transporting machine controlling circuit 104 for controlling the motor 53 of the transporting machine feeding apparatus 8, and an output signal $S_9$ of the open door detection switch 103 of the operation panel 102 is inputted to another input terminal of the transporting machine controlling circuit 104.

In the automatic cassette changer constructed in such a manner as described above, operations of loading small, middle and large size cassettes 10, 11 and 12 into the accommodating racks 3 in the changer body 1 are performed by manual operation of the operator with the hinged door 2 open. Further, a checking operation of the inside of the changer body 1 and so forth can be performed from the front face side of the changer body 1 with the hinged door 2 open.

If the operator releases locking of the closed door locking apparatus 101a and 101b of the hinged door 2 in order to perform operations of loading cassettes into the changer body 1, a checking operation of the inside of the changer body 1 or the like, then the open door detection switches incorporated in the closed door locking apparatus 101a and 101b are turned on, and the output signals $S_7$ and $S_8$ of them are inputted to the transporting machine controlling circuit 104. Further, also when the operator switches the open door detection switch 103 of the operation panel 102 on, the output signal $S_9$ of it is inputted to the transporting machine controlling circuit 104.

When any one of the signals $S_7$, $S_8$ and $S_9$ is inputted to the transporting machine controlling circuit 104, the motor 53 of the transporting machine feeding apparatus 8 is energized immediately so that, even if the transporting machine 7 is at any position in the transportation space $S_1$ shown in FIGS. 1 and 2, the transporting machine 7 is automatically transported in the direction of the arrow mark b to and stopped at the inside of the refuge space $S_2$ provided above the transportation space $S_1$.

Accordingly, when the operator either releases locking of the closed door locking apparatus 101a and 101b or switches the open door detection switch 103 of the operation panel 102 on, the transporting machine 7 is always retracted into the refuge space $S_2$, and consequently, when the operator subsequently opens the hinged door 2, the transporting machine 7 is not within the transportation space $S_1$. Consequently, a cassette loading operation, a checking operation of the inside or the like can be performed safely and readily without being obstructed by the transporting machine 7 at all. Further, if locking of any one of the closed door locking apparatus 101a and 101b is released, then since the transporting machine 7 is automatically retracted into the refuge space $S_2$, it is very safe even if the operator opens the hinged door 2 inadvertently. Further, since the transporting machine 7 is automatically retracted into the refuge space $S_2$ provided above the transportation space $S_1$, there is no such danger at all that a cassette, a tool or the like drops inadvertently onto the transporting machine 7 to damage the transporting machine 7 during a cassette loading operation, a checking operation of the inside or the like.

While the specific embodiment of the present invention has been described so far, the present invention is not limited to the embodiment described above and various modifications can be made within the technical scope and spirit of the present invention.

Further, the present invention is not limited to an automatic changer for video cassettes but can be applied to automatic changers for various types of cassettes in which various types of record media in the form of tapes or disks are accommodated.

What is claimed is:

1. An automatic cassette changer, comprising:
   a recording and/or reproducing apparatus;
   an accommodating rack having a plurality of bins for individually accommodating therein a plurality of cassettes each having a recording medium accommodated therein; and
   a transporting apparatus for selectively transporting one of the cassettes accommodated in said bins to said recording and/or reproducing apparatus so as to be recorded and/or reproduced by said recording and/or reproducing apparatus or vice versa;
   said transporting apparatus including holding means for holding a cassette thereon, and first feeding means for feeding said holding means in a first direction in which a cassette held by said holding means is inserted into or removed from any of said bins and said recording and/or reproducing apparatus;
   said first feeding means including a first slider movable in the first direction with respect to said transporting apparatus, a second slider having said holding means mounted thereon and movable in the first direction with respect to said first slider, and first driving means for driving said first and second sliders to move in the first direction.

2. An automatic cassette changer according to claim 1, wherein said transporting apparatus further includes second feeding means for feeding said holding means in a second direction perpendicular to the first direction.

3. An automatic cassette changer according to claim 2, wherein said second feeding means includes a third slider movable in the second direction with respect to said transporting apparatus, a fourth slider movable in the second direction with respect to said third slider and having said first feeding means mounted thereon, and second driving means for driving said third and fourth sliders to move in the second direction.

4. An automatic cassette changer according to claim 3, wherein at least one of said bins is capable of accommodating therein a cassette of another type which has a different size from that of the remaining cassettes accommodated in the other bins.

5. An automatic cassette changer according to claim 4, wherein the at least one bin is capable of accommodating therein a cassette having a comparatively large size and has a size sufficient to accommodate a plurality of cassettes of a comparatively small size in a juxtaposed relationship in the second direction therein.

6. An automatic cassette changer according to claim 3, wherein said second driving means includes second moving means for moving said third slider and second transmitting means for transmitting the moving force of said third slider to said fourth slider, and moves said third and fourth sliders simultaneously in the same direction of the second direction.

7. An automatic cassette changer according to claim 6, wherein said second transmitting means includes a pair of pulleys mounted on the opposite ends of said third slider, and a belt extending between said pulleys and connected to said fourth slider.

8. An automatic cassette changer according to claim 6, wherein said second moving means for moving said third slider includes a toothed rack extending in the second direction of said fourth slider, and a pinion for driving said toothed rack.

9. An automatic cassette changer according to claim 3, further comprising detecting means for detecting the size of a cassette accommodated in said accommodating rack.

10. An automatic cassette changer according to claim 9, further comprising controlling means for receiving a detection signal from said detecting means and controlling said second driving means in response to the received detection signal.

11. An automatic cassette changer according to claim 1, wherein said first driving means includes first moving means for moving said first slider and first transmitting means for transmitting the moving force of said first slider to said second slider, and moves said first and second sliders simultaneously in the same direction of the first direction.

12. An automatic cassette changer according to claim 11, wherein said first transmitting means includes a pair of pulleys mounted at the opposite ends of said first slider, and a belt extending between said pulleys and connected to said second-slider.

13. An automatic cassette changer according to claim 11, wherein said first moving means for moving said first slider includes a toothed rack extending in the first direction on said second slider, and a pinion for driving said toothed rack.

14. An automatic cassette changer according to claim 1, further comprising detecting means for detecting the size of a cassette accommodated in said accommodating rack.

15. An automatic cassette changer according to claim 14, further comprising controlling means for receiving a detection signal from said detecting means and controlling said first driving means in response to the received detection signal to control the stroke of said holding means in the first direction.

16. An automatic cassette changer according to claim 14, wherein said detecting means includes a plurality of photo-sensors each including a light emitting element and a light receiving element.

17. An automatic cassette changer according to claim 16, wherein the light receiving elements and the light receiving elements of said photo-sensors are mounted on opposing faces of a pair of base plates which are mounted on the opposite sides of said accommodating rack.

18. An automatic cassette changer according to claim 1, wherein said recording and/or reproducing apparatus is arranged in the same orientation as said accommodating rack, and further comprising a door provided along a front face of said automatic cassette changer, said transporting apparatus being movable between said door and said recording and/or reproducing apparatus and accommodating rack, and controlling means for controlling said transporting apparatus to be positioned at a predetermined position when said door is open.

19. An automatic cassette changer according to claim 18, wherein the predetermined position is an area on a line on which said recording and/or reproducing apparatus and said accommodating rack are positioned.

20. An automatic cassette changer according to claim 18, further comprising locking means for locking said door and detecting means for detecting an unlocked condition of said door, said controlling means controlling the position of said transporting apparatus in response to detection by said detecting means.

21. An automatic cassette changer, comprising:
a recording and/or reproducing apparatus;
an accommodating rack having a plurality of bins for individually accommodating therein a plurality of types of cassettes having different sizes, each of the cassettes having a recording medium accommodated therein; and
a transporting apparatus for selectively transporting one of the cassettes accommodated in said bins to said recording and/or reproducing apparatus so as to be recorded and/or reproduced by said recording and/or reproducing apparatus or vice versa;
said transporting apparatus including holding means for holding a cassette thereon, and first feeding means for feeding said holding means in a first horizontal direction perpendicular to a direction in which a cassette held by said holding means is inserted into or removed from any of said bins and said recording and/or reproducing apparatus;
said first feeding means including a first slider movable in the first direction with respect to said transporting apparatus, a second slider having said holding means mounted thereon and movable in the first direction with respect to said first slider, and first driving means for driving said first and second sliders to move in the first direction.

22. An automatic cassette changer according to claim 21, wherein each of said bins has a size sufficient to accommodate a cassette of a comparatively large size therein and sufficient to accommodate a plurality of cassettes of a comparatively small size in a juxtaposed relationship in the first direction therein.

23. An automatic cassette changer according to claim 21, wherein said first driving means includes means for moving said first slider and transmitting means for transmitting the moving force of said first slider to said second slider, and moves said first and second sliders simultaneously in the same direction of the first direction.

24. An automatic cassette changer, comprising:
a recording and/or reproducing apparatus;
an accommodating rack having a plurality of bins for individually accommodating therein a plurality of cassettes each having a recording medium accommodated therein, at least one of said bins being capable of accommodating therein a cassette of another type which has a comparatively large size different from that of the remaining cassettes accommodated in the other bins and sufficient to accommodate a plurality of cassettes of a comparatively small size in a juxtaposed relationship in the second direction therein;
a transporting apparatus for selectively transporting one of the cassettes accommodated in said bins to said recording and/or reproducing apparatus so as to be recorded and/or reproduced by said recording and/or reproducing apparatus or vice versa;
said transporting apparatus including holding means for holding a cassette thereon, first feeding means for feeding said holding means in a first direction in which a cassette held by said holding means is inserted into or removed from any of said bins and said recording and/or reproducing apparatus, and second feeding means for feeding said holding means in a second direction perpendicular to the first direction;
said first feeding means including a first slider movable in the first direction with respect to said transporting apparatus, a second slider having said holding means mounted thereon and movable in the first direction with respect to said first slider, and first driving means for driving said first and second sliders to move in the first direction;
said second feeding means including a third slider movable in the second direction with respect to said transporting apparatus, a fourth slider movable in the second direction with respect to said third slider and having said first feeding means mounted thereon, and second driving means for driving said third and fourth sliders to move in the second direction;
said first driving means including first moving means for moving said first slider and first transmitting means for transmitting the moving force of said first slider to said second slider, said first driving means moving said first and second sliders simultaneously in the same direction of the first direction, said first transmitting means including a pair of pulleys mounted at the opposite ends of said first slider and a belt extending between said pulleys and connected to said second slider, said first moving means for moving said first slider including a toothed rack extending in the first direction on said second slider and a pinion for driving said toothed rack;

said second driving means including second moving means for moving said third slider and second transmitting means for transmitting the moving force of said third slider to said fourth slider, said second driving means moving said third and fourth sliders simultaneously in the same direction of the second direction, said second transmitting means including a pair of pulleys mounted on the opposite ends of said third slider and a belt extending between said pulleys and connected to said fourth slider, said second moving means for moving said third slider including a toothed rack extending in the second direction of said fourth slider and a pinion for driving said toothed rack.

* * * * *